United States Patent
Sheffer et al.

(10) Patent No.: US 12,033,245 B2
(45) Date of Patent: Jul. 9, 2024

(54) SYSTEM AND METHOD FOR MIXED REALITY

(71) Applicant: ELBIT SYSTEMS LTD., Haifa (IL)

(72) Inventors: Amir Sheffer, Haifa (IL); Ayelet Mashiah, Haifa (IL); Ofer Livneh, Haifa (IL); Yoav Ophir, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 18/457,367

(22) Filed: Aug. 29, 2023

(65) Prior Publication Data

US 2023/0401759 A1    Dec. 14, 2023

Related U.S. Application Data

(63) Continuation of application No. 17/741,482, filed on May 11, 2022, now Pat. No. 11,783,515, which is a (Continued)

(30) Foreign Application Priority Data

Nov. 18, 2019 (IL) .......................................... 270754
Nov. 18, 2019 (IL) .......................................... 270755

(51) Int. Cl.
    *G06T 11/00*      (2006.01)

(52) U.S. Cl.
    CPC .................... *G06T 11/00* (2013.01)

(58) Field of Classification Search
None
See application file for complete search history.

(56) References Cited

U.S. PATENT DOCUMENTS 6,500,008 B1    12/2002    Ebersole et al.
8,040,361 B2    10/2011    Bachelder et al.
(Continued)

FOREIGN PATENT DOCUMENTS

EP    4062381 A1    9/2022
FR    3064801 A1    8/2019
(Continued)

OTHER PUBLICATIONS

J. Fischer, D. Bartz and W. Strasser, "Enhanced visual realism by incorporating camera image effects," 2006 IEEE/ACM International Symposium on Mixed and Augmented Reality, Santa Barbara, CA, USA, 2006, pp. 205-208, doi: 10.1109/ISMAR.2006.297815. (Year: 2006).*

(Continued)

*Primary Examiner* — David H Chu
(74) *Attorney, Agent, or Firm* — S. J. Intellectual Property Ltd.

(57) ABSTRACT

A mixed A mixed reality system, comprising: a sensor configured to acquire readings of real-world data, and display, on an output device, a real-world visualization of the real-world data based on the readings to a user, wherein the sensor has one or more parameters affecting the real-world visualization; and a processing circuitry configured to: obtain (a) information of one or more virtual entities located within an area from which the readings are acquired, the information defining, for each of the virtual entities, one or more simulated physical properties, and (b) values of one or more situational parameters indicative of a state of the sensor during acquisition of the readings, wherein the values of the one or more situational parameters are readings of one or more situational sensors, sensing the state of the sensor and its surroundings during acquisition of the readings; determine, for at least one given virtual entity of the virtual (Continued)

entities, a virtual entity visualization of the given virtual entity, the virtual entity visualization determined by manipulating a simulated reading of the simulated physical properties based on (a) the parameters affecting the real-world visualization, and (b) the values of the situational parameters; and display the virtual entity visualizations in combination with the real-world visualization, thereby enabling a user viewing the output device to view the virtual entity visualizations and the real-world visualization.

18 Claims, 9 Drawing Sheets

Related U.S. Application Data continuation of application No. PCT/IL2020/051179, filed on Nov. 5, 2020.

(56) References Cited

U.S. PATENT DOCUMENTS

| | | | |
|---|---|---|---|
| 8,616,884 B1 | 12/2013 | Lechner et al. | |
| 8,647,202 B2 | 2/2014 | Crevin et al. | |
| 9,536,355 B1 | 1/2017 | Kumar et al. | |
| 9,754,507 B1 | 9/2017 | Wenger et al. | |
| 10,192,145 B2* | 1/2019 | Ben Himane | G06V 10/40 |
| 2005/0275664 A1* | 12/2005 | Hobgood | H04N 13/00 |
| | | | 345/633 |
| 2006/0178758 A1 | 8/2006 | Koriat | |
| 2008/0175507 A1* | 7/2008 | Lookingbill | G06V 20/63 |
| | | | 382/255 |
| 2009/0305198 A1 | 12/2009 | Lefevre et al. | |
| 2013/0028600 A1 | 1/2013 | Chang et al. | |
| 2013/0093788 A1 | 4/2013 | Liu et al. | |
| 2013/0286004 A1* | 10/2013 | McCulloch | G06T 19/006 |
| | | | 345/419 |
| 2014/0002444 A1 | 1/2014 | Bennett et al. | |
| 2014/0029281 A1 | 1/2014 | Suckling et al. | |
| 2014/0132628 A1 | 5/2014 | Hoff, III | |
| 2014/0354532 A1* | 12/2014 | Mullins | G06V 20/20 |
| | | | 345/156 |
| 2015/0375128 A1 | 12/2015 | Villar et al. | |
| 2016/0009310 A1 | 1/2016 | Seki et al. | |
| 2016/0131912 A1 | 5/2016 | Border et al. | |
| 2016/0253819 A1* | 9/2016 | Mendez Mendez | G06T 19/006 |
| | | | 382/197 |
| 2016/0267720 A1 | 9/2016 | Mandella et al. | |
| 2017/0115488 A1* | 4/2017 | Ambrus | G02B 27/0172 |
| 2017/0294135 A1 | 10/2017 | Lechner | |
| 2018/0075658 A1 | 3/2018 | Lanier et al. | |
| 2018/0122144 A1 | 5/2018 | Hubo et al. | |
| 2018/0293802 A1 | 10/2018 | Hendricks et al. | |
| 2019/0001282 A1 | 1/2019 | Parks | |
| 2019/0012828 A1* | 1/2019 | Jung | G06T 19/20 |
| 2020/0026076 A1* | 1/2020 | Beckman | H04N 23/55 |
| 2020/0033602 A1* | 1/2020 | Nocon | G02B 27/0172 |
| 2020/0263957 A1* | 8/2020 | Northrup | F41A 33/00 |
| 2020/0334882 A1* | 10/2020 | Chang | G06V 10/242 |
| 2021/0097757 A1* | 4/2021 | Yeung | G06T 15/005 |
| 2022/0270303 A1 | 8/2022 | Sheffer et al. | |
| 2023/0298733 A1* | 9/2023 | Powers | A61B 5/0077 |
| | | | 434/236 |

FOREIGN PATENT DOCUMENTS

| | | |
|---|---|---|
| JP | H11175762 A1 | 7/1997 |
| WO | 2017197287 A1 | 11/2017 |
| WO | 2018083099 A1 | 5/2018 |
| WO | 2021100037 A1 | 5/2021 |

OTHER PUBLICATIONS

Simulating Night Vision Goggle Effects In a Virtual Environment: A Preliminary Evaluation; Robert J. Pleban U.S. Army Research Institute ; Scott A. Beal Auburn University Consortium Research Fellows Program; Apr. 2002.

When three worlds collide: A model of the tangible interaction process; Conference Paper • Jan. 2009 DOI: 10.1145/1738826. 1738892 • Source: DBLP; https://www.researchgate.net/publication/221332102.

Klein G., Murray D. (2010) Simulating Low-Cost Cameras for Augmented Reality Compositing, IEEE Transactions on Visualization and Computer Graphics (vol. 16, No. 3., pp. 369-380).

M. E. Gadringer, H. Schreiber, A. Gruber, M. Vorderderfler, D. Amschl, W. Bösch, S. Metzner, H. Pflügl,M. Paulweber, "Virtual reality for automotive radars", Elektrotechnik & Informationstechnik https://doi.org/10.1007/s00502-018-0620-9, accepted May 24, 2018.

Loscos C. et al: "Interactive virtual relighting of real scenes", IEEE Transactions on Visualization and Computer Graphics, vol. 6, No. 4, Jan. 1, 2000 (Jan. 1, 2000) , pp. 289-305, XP093093071, USA ISSN: 1077-2626, DOI: 10.1109/2945.895874 Retrieved from the Internet: URL:https://inria.hal.science/inria-005275 23/document>; abstract* section 3; figure 1 *.

Rickson Austin et al: "Is It Cold in Here or Is It Just Me? Analysis of Augmented Reality Temperature Visualization for Computer-Mediated Thermoception", 2019 IEEE International Symposium on Mixed and Augmented Reality (ISMAR), IEEE, Oct. 14, 2019 (Oct. 14, 2019), pp. 202-211, XP033681405, DOI: 10.1109/ISMAR.2019. 000-2; [retrieved on Dec. 26, 2019]; abstract; figure 3 * section 3.4*.

Lahoud Fayez et al: "Ar in VR: Simulating Infrared Augmented Vision", 2018 25th IEEE International Conference on Image Processing (ICIP), IEEE, Oct. 7, 2018 (Oct. 7, 2018), pp. 3893-3897, XP033455379, DOI: 10.1109/ICIP.2018.8451811 [retrieved on Aug. 29, 2018] * abstract *.

Ryan Bane et al: "Interactive Tools for Virtual X-Ray Vision in Mobile Augmented Reality", Proceedings of the Third IEEE and ACM International Symposium on Mixed and Augmented Reality, Nov. 2-5, Arlington, VA, USA, IEEE, Piscataway, NJ, USA, Nov. 2, 2004 (Nov. 4, 2004), pp. 231-239, XP058382688, DOI: 10.1109/ISMAR.2004.36ISBN: 978-0-7695-2191-6; * abstract; figures 1,4.

* cited by examiner

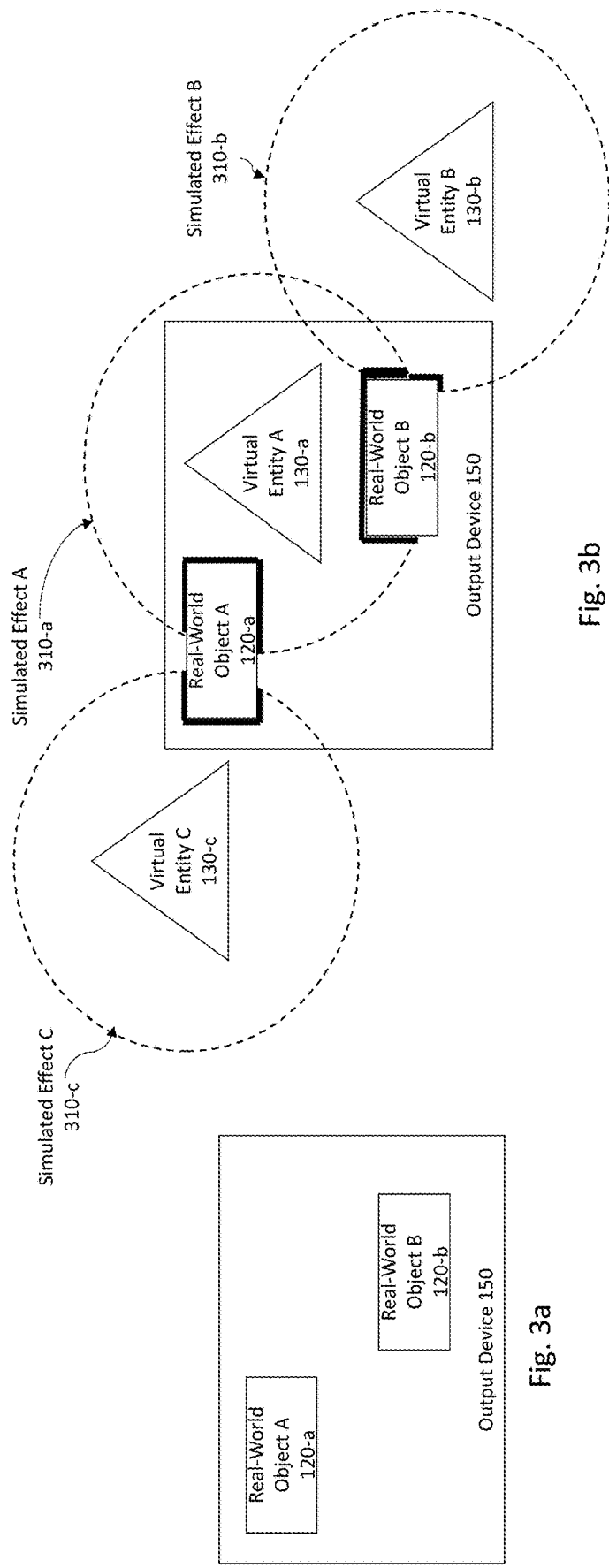

| deg | Transformation function warping/distortions |
|---|---|
| 5 | A |
| 10 | B |
| 15 | C |
| 20 | D |

Fig. 12a

| Type | Transformation function warping/distortions |
|---|---|
| road | AB |
| sea | CD |
| Off road | 3EF |

Fig. 12b

| Velocity | Transformation function warping/distortions |
|---|---|
| 10 | L |
| 50 | M |
| 100 | N |
| 150 | O |

Fig. 12c

| Type | Sub type A | Transformation function warping/distortions |
|---|---|---|
| Airborne | F16 | Q |
|  | F15 | M |
|  | F18 | N |
| Drone | Hermes 450 | A |
|  | Hermes 900 | B |
| Land | APC | LL |

Fig. 12d

| Type | ID | Transformation function warping/distortions |
|---|---|---|
| Platform type | APC | LL |
| Sensor type | CMOS type | L |
| Velocity | 50 | M |
| Topography | Road | AB |
| temp | 10 | B |

Fig. 12e

SYSTEM AND METHOD FOR MIXED REALITY

TECHNICAL FIELD

The invention relates to a system and method for mixed reality.

BACKGROUND

Mixed reality is the merging of real and virtual worlds to produce new environments and visualizations where physical and digital objects co-exist and interact in real-time. Mixed reality takes place not only in the physical world or the virtual world, but is a hybrid of reality and virtual reality via immersive technology.

Mixed reality is used for a number of different applications: entertainment (e.g. interactive games, interactive movies, etc.), simulation-based learning, simulation-based training, where reality is simulated and represented in complex, layered data through an output device.

In some cases, the mixed reality environment includes a physical sensor (e.g. a radar, a camera, an infrared sensor, etc.) that displays, on an output device of the sensor (e.g. a screen, a Head Mounted Display, etc.), a combination of real-world visualizations of real-world data (acquired by the sensor) and virtual entity visualizations (located within an area from which the real-world data readings are acquired). The real-world visualizations can be affected by one or more parameters of the sensor (e.g. noise model characterizing readings of the sensor, spectral sensitivity of the sensor, signal-to-noise ratio of the sensor, etc.) or by one or more algorithms, employed on the readings of the real-world data by the sensor or by a communication link that is used to communicate the data from the location of the sensor itself to the location of the output device (e.g. a sensor is carried on a drone and the real-world data readings acquired by the sensor are communicated via a communication link to an output device located in a Ground Control Station (GCS) that is remote from the drone carrying the sensor).

A non-limiting example is an optical sensor with a fisheye lens that displays real-word visualizations with a visual distortion intended to create a wide panoramic or hemispherical image.

Current mixed reality systems, that include a physical sensor, do not take into consideration (a) the effects of the one or more parameters of the sensor on the virtual entity visualizations, (b) the effects of the one or more algorithms on the virtual entity visualizations, employed on the readings of the real-world data by the sensor and (c) the effects of the communication link between the physical sensor and the output device on the virtual entity visualizations. In the current mixed reality systems, the virtual entity visualizations are displayed by (a) injecting the virtual entity visualizations into the output device, and/or (b) by displaying the virtual entity visualizations on a see-through output device overlaying the output device, and/or (c) by projecting the virtual entity visualizations on the real-world visualization. Thus, the virtual entity visualizations are not affected by the one or more parameters of the sensor, by the one or more algorithms or by the communication link as the real-world data acquired by the sensor. In these cases, the virtual entity visualizations are provided to the output device through a communication channel that is different from the communication channel through which the real-world visualizations are provided to the output device, thus the virtual entity visualizations are not affected as the real-world visualizations are affected.

This causes current mixed reality simulation systems that include a physical sensor to display the virtual entity visualizations, on the output device, in a way that is perceived to be different than the real-world visualizations. Continuing our non-limiting example: the optical sensor with the fisheye lens will display real-word visualizations with a fisheye visual distortion, but virtual entity visualizations will be displayed without the fisheye visual distortion, thus a user of the optical sensor will be able to discern between the real-word visualizations and the virtual entity visualizations displayed on the output device of the optical sensor—an outcome that can be problematic in mixed reality environments where the user should not perceive virtual entities differently than the real-world data.

In addition, current mixed reality simulation systems that include a data acquisition device (e.g. a physical sensor, a radio receiver, etc.) do not change the way the acquisition device displays the acquired data in a mixed reality environment in response to an effect by a virtual effect. For example, a radar, that is part of a mixed reality simulation system can have temporary restricted coverage because of a simulated virtual interference, however, in current mixed reality simulation systems will display the acquired data without taking into account the temporary restricted coverage.

Another non-limiting example can be a thermal sensor that should be blinded (or otherwise affected) by virtual heat simulated in an area viewed by the sensor, but current mixed reality simulation systems will not take into account an effect of the virtual heat on the thermal sensor. Another example can be a real-world radio receiver that would not have been able to receive radio signals in a given channel due to a virtual radio source transmitting it's a virtual radio signal in the given channel, but current mixed reality simulation systems will not take into account an effect of the virtual radio source.

There is thus a need in the art for a new method and system for mixed reality.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,616,884 (Lechner et al.) published on Dec. 31, 2013, discloses a method and apparatus for training in an aircraft. A display system is associated with an aircraft. A sensor system is associated with the aircraft. A training processor is configured to be connected to the aircraft. The training processor is configured generate constructive data for a number of simulation objects and generate simulation sensor data using the constructive data. The training processor is further configured to present the simulation sensor data with live sensor data generated by the sensor system for an aircraft on a display system in the aircraft.

US Patent application No. 2017/0294135 (Lechner) published on Oct. 12, 2017, discloses a system is provided for real-time, in-flight simulation of a target. A sensor system may generate a live stream of an environment of an aircraft during a flight thereof, the live stream having associated metadata with structured information indicating a real-time position of the aircraft within the environment. A target generator may generate a target image from a source of information from which a plurality of different target images may be generable. The target generator may also generate a synthetic scene of the environment including the target image. A superimposition engine may then superimpose the synthetic scene onto the live stream such that the target image is spatially and temporally correlated with the real-time position of the aircraft within the environment. The live stream with superimposed synthetic scene may be output for presentation on a display of the aircraft during the flight.

US Patent application No. 2013/0286004 (McCulloch et al.) published on Oct. 31, 2013, discloses a technology described for displaying a collision between objects by an augmented reality display device system. A collision between a real object and a virtual object is identified based on three-dimensional space position data of the objects. At least one effect on at least one physical property of the real object is determined based on physical properties of the real object, like a change in surface shape, and physical interaction characteristics of the collision. Simulation image data is generated and displayed simulating the effect on the real object by the augmented reality display. Virtual objects under control of different executing applications can also interact with one another in collisions.

US Patent application No. 2018/0075658 (Lanier et al.) published on Mar. 15, 2018, discloses techniques that include mixed reality tools, referred to as HoloPaint, that allow use of any of a variety of sensors to determine physical parameters of real objects in a mixed reality environment. HoloPaint may correlate current measurements of the real world with past measurements to perform inventory management, analysis of changes of physical parameters of real objects and environments, and so on. A user may select which parameter to analyze by selecting a particular type of virtual paint, such as for drawing onto an object to be analyzed.

General Description

In accordance with a first aspect of the presently disclosed subject matter, there is provided a mixed reality system, comprising: a data acquisition device configured to acquire real-world data; an output device for providing the real-world data to a user; and a processing circuitry configured to: obtain (a) data acquired by the data acquisition device, and (b) information of one or more virtual entities having properties enabling determination of simulated effects of the virtual entities on the data; determine the simulated effects of the virtual entities on the data utilizing the properties; and provide the user with output on the output device being a manipulation of the data reflecting the simulated effects.

In some cases, the data acquisition device is a sensor or a radio receiver.

In some cases, the sensor is one of the following: a camera, a radar, Night Vision Goggles (NVG), a proximity sensor, temperature sensor, an infrared sensor, pressure sensor, light sensor, touch sensor, ultrasonic sensor, color sensor, humidity sensor, tilt sensor, accelerometer, or an acoustic sensor.

In some cases, the processing circuitry determines the simulated effects also utilizing one or more parameters of the sensor or the radio receiver.

In some cases, the data is acquired from a training environment, and wherein the virtual entities are designed to simulate training scenarios.

In some cases, the simulated effect is one or more of: virtual heat, virtual light, virtual touch, virtual shade, virtual sound, virtual topography, virtual smoke, virtual hit, or virtual ice.

In accordance with a second aspect of the presently disclosed subject matter, there is provided a method comprising: obtaining, by a processing resource, (a) data acquired by a data acquisition device configured to acquire real-world data, and (b) information of one or more virtual entities having properties enabling determination of simulated effects of the virtual entities on the data; determining, by the processing resource, the simulated effects of the virtual entities on the data utilizing the properties; and providing, by the processing resource, a user of an output device, used for providing the real-world data to the user, with output on the output device being a manipulation of the data reflecting the simulated effects.

In some cases, the data acquisition device is a sensor or a radio receiver.

In some cases, the sensor is one of the following: a camera, a radar, Night Vision Goggles (NVG), a proximity sensor, temperature sensor, an infrared sensor, pressure sensor, light sensor, touch sensor, ultrasonic sensor, color sensor, humidity sensor, tilt sensor, accelerometer, or an acoustic sensor.

In some cases, the determining of the simulated effects also utilizes one or more parameters of the sensor or the radio receiver.

In some cases, the data is acquired from a training environment, and wherein the virtual entities are designed to simulate training scenarios.

In some cases, the simulated effect is one or more of: virtual heat, virtual light, virtual touch, virtual shade, virtual sound, virtual topography, virtual smoke, virtual hit, or virtual ice.

In accordance with a third aspect of the presently disclosed subject matter, there is provided a non-transitory computer readable storage medium having computer readable program code embodied therewith, the computer readable program code, executable by at least one processor of a computer to perform a method comprising: obtaining, by a processing resource, (a) data acquired by a data acquisition device configured to acquire real-world data, and (b) information of one or more virtual entities having properties enabling determination of simulated effects of the virtual entities on the data; determining, by the processing resource, the simulated effects of the virtual entities on the data utilizing the properties; and providing, by the processing resource, a user of an output device, used for providing the real-world data to the user, with output on the output device being a manipulation of the data reflecting the simulated effects.

In accordance with a fourth aspect of the presently disclosed subject matter, there is provided a mixed reality system, comprising: a sensor configured to acquire readings of real-world data, and display, on an output device, a real-world visualization of the real-world data based on the readings to a user, wherein the sensor has one or more parameters affecting the real-world visualization; and a processing circuitry configured to: obtain information of one or more virtual entities located within an area from which the readings are acquired, the information defining, for each of the virtual entities, one or more simulated physical properties; determine, for at least one given virtual entity of the virtual entities, a virtual entity visualization of the given virtual entity, the virtual entity visualization determined by manipulating a simulated reading of the simulated physical properties based on the parameters affecting the real-world visualization; and display the virtual entity visualizations in combination with the real-world visualization, thereby enabling a user viewing the output device to view the virtual entity visualizations and the real-world visualization.

In some cases, the display is performed by injecting the virtual entity visualizations into the output device.

In some cases, the display is performed on a see-through output device overlaying the output device.

In some cases, the display is performed by projecting the virtual entity visualizations on the real-world visualization.

In some cases, the real-world visualization is provided to the output device via a first communication channel and the virtual entity visualizations are injected into the output device via a second communication channel other than the first communication channel.

In some cases, the parameters affect the real-world visualization by affecting the first communication channel.

In some cases, the manipulating of the simulated reading further includes simulating communication effects of the first communication channel on the virtual entity visualizations.

In some cases, the virtual entity visualization of the given virtual entity is perceived closer to a third visualization of the given virtual entity had it been a real-world entity having physical properties identical to the simulated physical properties than an alternative visualization of the given virtual entity determined without manipulating the simulated reading of the simulated physical properties based on the parameters affecting the readings of the sensor.

In some cases, the manipulating of the simulated reading further includes employing one or more algorithms, employed on the readings of the real-world data, also on the simulated reading.

In some cases, the parameters affect the real-world visualization by affecting the readings.

In some cases, the parameters include one or more of: a noise model characterizing readings of the sensor; a spectral sensitivity of the sensor; a spectral response of the sensor; a saturation of the sensor; a dynamic range of the sensor; a dark noise of the sensor; a signal-to-noise ratio of the sensor; a detection limit of the sensor; a photo response non uniformity of the sensor; a penetration depth of the sensor; a lens distortion of the sensor; an optical deformation model of the sensor; a vignetting model of the sensor; response to different exposure levels of the sensor; or a resolution map of the readings acquired by the sensor.

In some cases, the processing circuitry is further configured to: obtain information of movement of the sensor during acquisition of the readings; determine if the movement of the sensor generates an effect on the real-world visualization, utilizing the information and the parameters; wherein upon determining that the movement generates the effect, the manipulating of the simulated reading further includes simulating the effect on the simulated reading.

In some cases, the processing circuitry is further configured to: obtain information of simulated movement of the given virtual entity during acquisition of the readings; determine if the simulated movement of the given virtual entity is required to generate an effect on the simulated reading, utilizing the information and the parameters; wherein upon determining that the movement is required to generate the effect, the manipulating of the simulated reading further includes simulating the effect on the simulated reading.

In some cases, the processing circuitry is further configured to: obtain information of environmental parameters of at least part of a region from which the readings are acquired; determine if the environmental parameters generate an effect on the real-world visualization, utilizing the information and the parameters; wherein upon determining that the environmental parameters generate the effect, the manipulating of the simulated reading further includes simulating the effect on the simulated reading.

In some cases, the processing circuitry is further configured to: obtain values of one or more situational parameters indicative of a state of the sensor during acquisition of the readings; and wherein the virtual entity visualization is determined also based on the values of the situational parameters.

In some cases, the situational parameters include one or more of: a temperature of the sensor; a vibration frequency of the sensor; or a type of platform the sensor is connected to.

In accordance with a fifth aspect of the presently disclosed subject matter, there is provided a method comprising: obtaining, by a processing circuitry, information of one or more virtual entities located within an area from which readings are acquired by a sensor configured to acquire readings of real-world data, and display, on an output device, a real-world visualization of the real-world data based on the readings to a user, wherein the sensor has one or more parameters affecting the real-world visualization, and wherein the information defining, for each of the virtual entities, one or more simulated physical properties; determining, by the processing circuitry, for at least one given virtual entity of the virtual entities, a virtual entity visualization of the given virtual entity, the virtual entity visualization determined by manipulating a simulated reading of the simulated physical properties based on the parameters affecting the real-world visualization; and displaying, by the processing circuitry, the virtual entity visualizations in combination with the real-world visualization, thereby enabling a user viewing the output device to view the virtual entity visualizations and the real-world visualization.

In some cases, the display is performed by injecting the virtual entity visualizations into the output device.

In some cases, the display is performed on a see-through output device overlaying the output device.

In some cases, the display is performed by projecting the virtual entity visualizations on the real-world visualization.

In some cases, the real-world visualization is provided to the output device via a first communication channel and the virtual entity visualizations are injected into the output device via a second communication channel other than the first communication channel.

In some cases, the parameters affect the real-world visualization by affecting the first communication channel.

In some cases, the manipulating of the simulated reading further includes simulating communication effects of the first communication channel on the virtual entity visualizations.

In some cases, the virtual entity visualization of the given virtual entity is perceived closer to a third visualization of the given virtual entity had it been a real-world entity having physical properties identical to the simulated physical properties than an alternative visualization of the given virtual entity determined without manipulating the simulated reading of the simulated physical properties based on the parameters affecting the readings of the sensor.

In some cases, the manipulating of the simulated reading further includes employing one or more algorithms, employed on the readings of the real-world data, also on the simulated reading.

In some cases, the parameters affect the real-world visualization by affecting the readings.

In some cases, the parameters include one or more of: a noise model characterizing readings of the sensor; a spectral sensitivity of the sensor; a spectral response of the sensor; a saturation of the sensor; a dynamic range of the sensor; a dark noise of the sensor; a signal-to-noise ratio of the sensor;

a detection limit of the sensor; a photo response non uniformity of the sensor; a penetration depth of the sensor; a lens distortion of the sensor; an optical deformation model of the sensor; a vignetting model of the sensor; response to different exposure levels of the sensor; or a resolution map of the readings acquired by the sensor.

In some cases, the method further comprising: obtaining, by the processing circuitry, information of movement of the sensor during acquisition of the readings; determining, by the processing circuitry, if the movement of the sensor generates an effect on the real-world visualization, utilizing the information and the parameters; wherein upon determining that the movement generates the effect, the manipulating of the simulated reading further includes simulating the effect on the simulated reading.

In some cases, the method further comprising: obtaining, by the processing circuitry, information of simulated movement of the given virtual entity during acquisition of the readings; determining, by the processing circuitry, if the simulated movement of the given virtual entity is required to generate an effect on the simulated reading, utilizing the information and the parameters; wherein upon determining that the movement is required to generate the effect, the manipulating of the simulated reading further includes simulating the effect on the simulated reading.

In some cases, the method further comprising: obtaining, by the processing circuitry, information of environmental parameters of at least part of a region from which the readings are acquired; determining, by the processing circuitry, if the environmental parameters generate an effect on the real-world visualization, utilizing the information and the parameters; wherein upon determining that the environmental parameters generate the effect, the manipulating of the simulated reading further includes simulating the effect on the simulated reading.

In some cases, the method further comprising: obtaining, by the processing circuitry, values of one or more situational parameters indicative of a state of the sensor during acquisition of the readings; and wherein the virtual entity visualization is determined also based on the values of the situational parameters.

In some cases, the situational parameters include one or more of: a temperature of the sensor; a vibration frequency of the sensor; or a type of platform the sensor is connected to.

In accordance with a sixth aspect of the presently disclosed subject matter, there is provided a non-transitory computer readable storage medium having computer readable program code embodied therewith, the computer readable program code, executable by at least one processor of a computer to perform a method comprising: obtaining, by a processing circuitry, information of one or more virtual entities located within an area from which readings are acquired by a sensor configured to acquire readings of real-world data, and display, on an output device, a real-world visualization of the real-world data based on the readings to a user, wherein the sensor has one or more parameters affecting the real-world visualization, and wherein the information defining, for each of the virtual entities, one or more simulated physical properties; determining, by the processing circuitry, for at least one given virtual entity of the virtual entities, a virtual entity visualization of the given virtual entity, the virtual entity visualization determined by manipulating a simulated reading of the simulated physical properties based on the parameters affecting the real-world visualization; and displaying, by the processing circuitry, the virtual entity visualizations in combination with the real-world visualization, thereby enabling a user viewing the output device to view the virtual entity visualizations and the real-world visualization.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 3a is a schematic illustration of an example of an output device displaying data acquired by a data acquisition device without effects of the virtual entities on the data, in accordance with the presently disclosed subject matter;

FIG. 3b is a schematic illustration of an example of effects of virtual entities on data acquired by a data acquisition device, in accordance with the presently disclosed subject matter;

FIGS. 12a-12e depict examples of prearranged look-up-tables, used to determine virtual entity visualizations.

DETAILED DESCRIPTION

Figure 1:
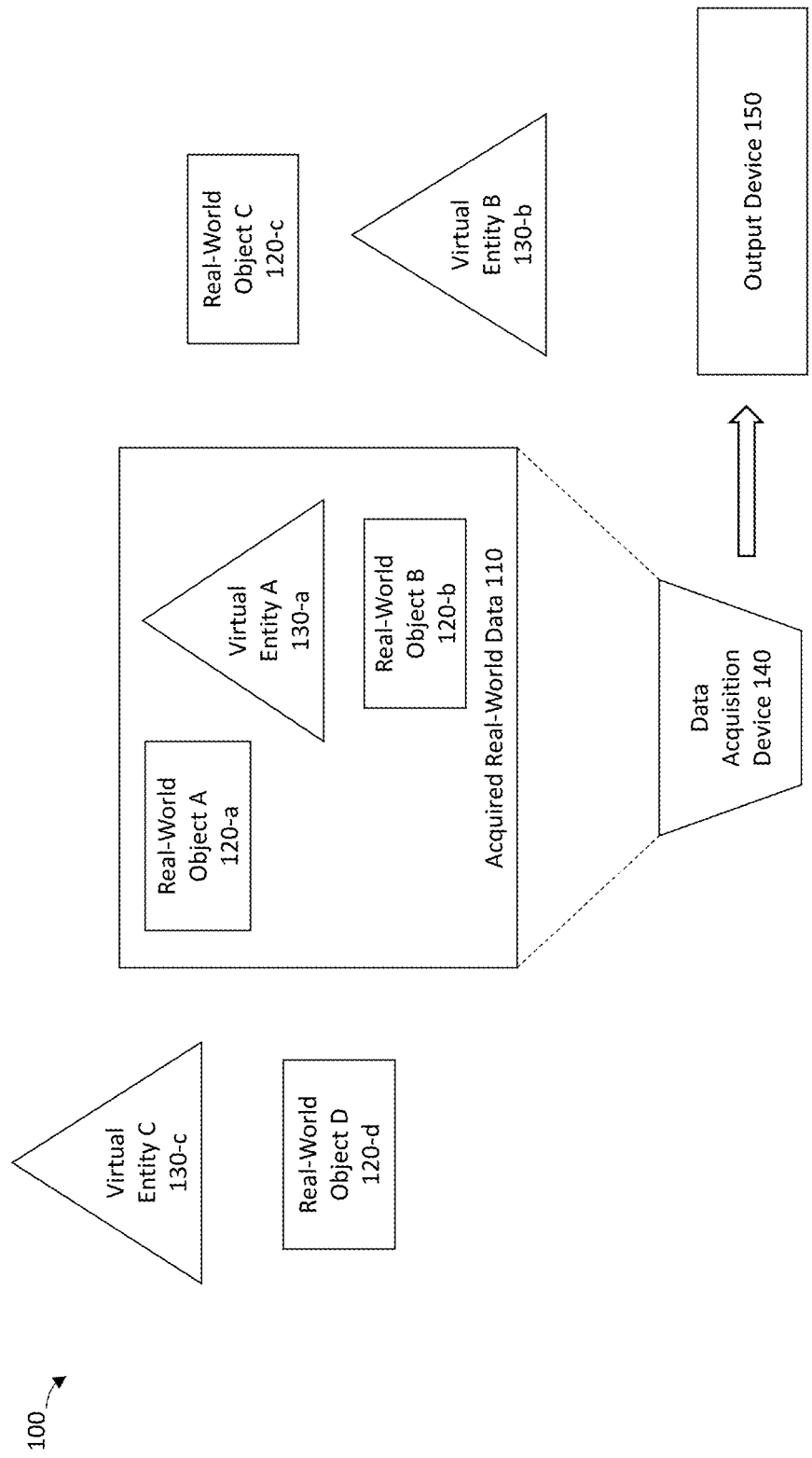
FIG. 1 is a schematic illustration of an example environment of a system for a mixed reality acquisition device, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "determining", "displaying", "communication", "providing" or the like, include action and/or processes of a computer that manipulate and/or transform data into other data, said data represented as physical quantities, e.g. such as electronic quantities, and/or said data representing the physical objects. The terms "computer", "processor", "processing resource" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 5-9 may be executed. In embodiments of the presently disclosed subject matter one or more stages illustrated in FIGS. 5-9 may be executed in a different order and/or one or more groups of stages may be executed simultaneously. FIGS. 1-4, 10-12 illustrate a general schematic of the system architecture in accordance with an embodiment of the presently disclosed subject matter. Each module in FIGS. 1-4, 10-12 can be made up of any combination of software, hardware and/or firmware that performs the functions as defined and explained herein. The modules in FIGS. 1-4, 10-12 may be centralized in one location or dispersed over more than one location. In other embodiments of the presently disclosed subject matter, the system may comprise fewer, more, and/or different modules than those shown in FIGS. 1-4, 10-12.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of an example environment of a system for a mixed reality acquisition device, in accordance with the presently disclosed subject matter.

According to the presently disclosed subject matter, a mixed reality environment 100 is shown. The mixed reality environment 100 includes one or more real-world objects (e.g. real-world object A 120-a, real-world object B 120-b, real-world object C 120-c, real-world object D 120-d). Real-world objects can be any object or land cover that is physically part of mixed reality environment 100. These can be natural or man-made objects, for example: trees, hills, clouds, cars, roads, houses or any other real-world object, land cover and/or weather element.

Additionally, mixed reality environment 100 can include one or more virtual entities (e.g. virtual entity A 130-a, virtual entity B 130-b, virtual entity C 130-c). Virtual entities can simulate real-world objects, land cover and/or weather element but they are not physically present in mixed reality environment 100. Virtual entities can have one or more properties. These properties can include the location of the virtual entity. These properties can additionally include information of the physical properties of an object simulated by the virtual entity. For example: Virtual entity A 130-a can be simulating a car. The properties can include the dimensions of the simulated car, the make of the simulated car, the amount of fuel the car has in its fuel tank, etc. The car can also have a location property (e.g. a coordinate, etc.) that can be used to establish its virtual geolocation within mixed reality environment 100.

In addition, virtual entities (e.g. virtual entity A 130-*a*, virtual entity B 130-*b*, virtual entity C 130-*c*) can cause virtual effects. The virtual effects can be determined based on properties of the virtual entities causing the virtual effects. For example, a virtual entity may be a heat source (e.g. a fire, an explosion, etc.) that has an effect on the real-world objects (e.g. real-world object A 120-*a*, real-world object B 120-*b*, real-world object C 120-*c*, real-world object D 120-*d*). These virtual entities can have one or more parameters that can enable determining a heat effecting radius (e.g. temperature, material emitting the heat, etc.).

The information regarding the virtual entities (e.g. virtual entity A 130-*a*, virtual entity B 130-*b*, virtual entity C 130-*c*) and their properties can be stored by a mixed reality system. The mixed reality system can be a centralized system, storing the information in a central data repository or a distributed system, storing the information in a distributed data repository.

In some cases, the mixed reality system includes one or more data acquisition devices 140. The data acquisition devices 140 are physical devices that are part of the mixed reality environment 100, and are able to acquire data from at least part of the mixed reality environment 100. The data acquisition device 140 can be a radio receiver (e.g. a Very High Frequency (VHF) radio receiver, a High Frequency (HF) radio receiver, an Ultra High Frequency (UHF) radio receiver, etc.), a sensor (e.g. a camera, a radar, Night Vision Goggles (NVG), a proximity sensor, temperature sensor, an infrared sensor, pressure sensor, light sensor, touch sensor, ultrasonic sensor, color sensor, humidity sensor, tilt sensor, accelerometer, an acoustic sensor, etc.) or any other device that can acquire data from at least part mixed reality environment 100. Acquired real-world data 110 is the data acquired by data acquisition device 140. It is to be noted that, as data acquisition device 140 can only acquire data that is physically present in environment 100, it does not acquire data related to the virtual entities (e.g. virtual entity A 130-*a*, virtual entity B 130-*b*, virtual entity C 130-*c*).

In a non-limiting example, data acquisition device 140 can be an infrared sensor and acquired real-world data 110 includes the infrared radiation emitted from at least part of environment 100, as sampled by data acquisition device 140. These samples include the infrared radiation emitted from real-world object A 120-*a* and real-world object B 120-*b* that are in the part of the environment that is sampled by data acquisition device 140. These samples do not include infrared radiation emitted from virtual entity A 130-*a*, even when the geolocation of virtual entity A 130-*a* is within the area of the acquired real-world data 110, as virtual entity A 130-*a* has no physical presence in environment 100 and thus does not emit any infrared radiation in the physical world.

In some cases, the mixed reality system includes one or more output devices 150 (e.g. a screen, a Head Mounted Display, a speaker, a combination thereof, etc.). The output device 150 can be used to display sounds and/or visualizations of the acquired real-world data 110. The mixed reality system can also use the output device to display a combination of sounds and/or visualizations of the acquired real-world data 110 (as acquired by data acquisition device 140) and sounds and/or visualizations of the virtual entities (e.g. virtual entity A 130-*a*, virtual entity B 130-*b*, virtual entity C 130-*c*) that are either located within an area from which the acquired real-world data 110 readings are acquired or have a virtual effect on the acquired real-world data 110.

The way sounds and/or visualizations of the virtual entities are outputted to output device 150 by the mixed reality system is dependent on the information regarding the virtual entities (e.g. virtual entity A 130-*a*, virtual entity B 130-*b*, virtual entity C 130-*c*) and their properties that is stored by the mixed reality system. Continuing our non-limiting example, virtual entity A 130-*a* is a car that has a property of engine temperature. The visualization of virtual entity A 130-*a* on output device 150 will be an infrared signature that is in accordance with the engine temperature.

The sounds and/or visualizations of the acquired real-world data 110 can be affected by one or more parameters of the data acquisition device 140. For example: noise model characterizing readings of the data acquisition device 140, spectral sensitivity of the data acquisition device 140, spectral response of the data acquisition device 140, saturation of the data acquisition device 140, dynamic range of the data acquisition device 140, dark noise of the data acquisition device 140, signal-to-noise ratio of the data acquisition device 140, detection limit of the data acquisition device 140, photo response non uniformity of the data acquisition device 140, penetration depth of the data acquisition device 140, lens distortion of the data acquisition device 140, optical deformation model of the data acquisition device 140, vignetting model of the data acquisition device 140, response to different exposure levels of the data acquisition device 140, resolution map of the readings acquired by the data acquisition device 140, or any other parameter of the data acquisition device 140 that affects the sounds and/or visualizations of the acquired real-world data 110.

In addition, the sounds and/or visualizations of the acquired real-world data 110 can be affected by a communication link that is used to communicate the acquired real-world data 110 from the data acquisition device 140 to the output device 150. Continuing our non-limiting example, data acquisition device 140 can be an infrared sensor that is carried on a drone and the acquired real-world data 110 are communicated via a communication link to the output device 150 located in a Ground Control Station (GCS) that is remote from the drone carrying the infrared sensor. The properties of the communication link, such as: bandwidth, delay times, compression rates and methods, etc., can change the visualization of the acquired real-world data 110 as it is displayed on output device 150. Another example, can be interferences in the communication link may change the visualization of the acquired real-world data 110 as it is displayed on output device 150.

In addition, the sounds and/or visualizations of the acquired real-world data 110 can be affected by one or more algorithms, employed on the readings of the real-world data by the mixed reality system. The sounds and/or visualizations of the acquired real-world data 110 can also be affected by other processing done by mixed reality system on the acquired real-world data 110. The processing of the acquired real-world data 110 and/or the employing of one or more algorithms on the acquired real-world data 110 can be done as part of the acquiring of data by data acquisition device 140, as part of the communication link, as part of output device 150, or in another processing unit that can be central or distributed, or in a combination thereof.

Figure 2B:
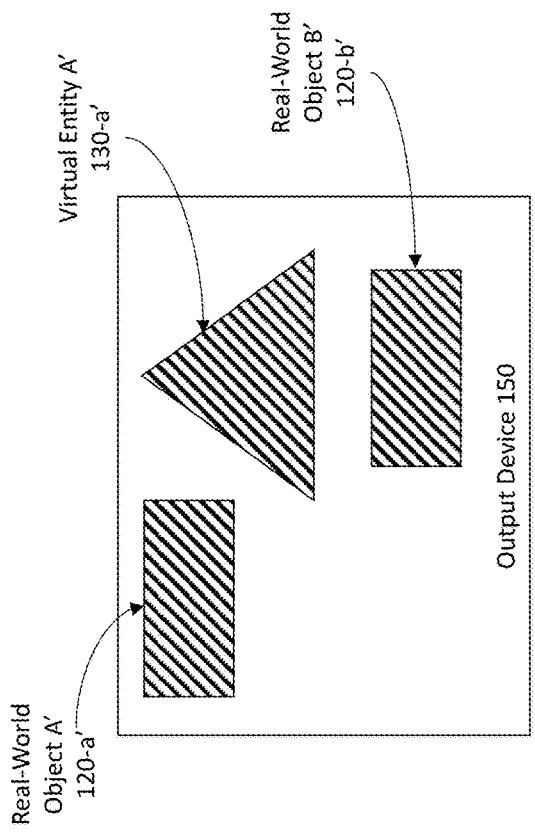
FIG. 2b is a schematic illustration of an example of an output device displaying real-world visualizations and virtual entity visualizations after manipulation of the virtual entity visualizations, in accordance with the presently disclosed subject matter.
Figure 2A:
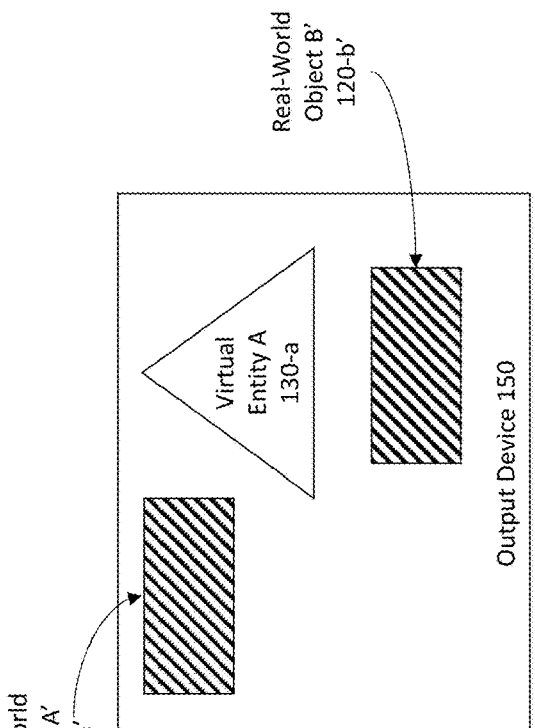
FIG. 2a is a schematic illustration of an example of an output device displaying real-world visualizations and virtual entity visualizations before manipulation of the virtual entity visualizations, in accordance with the presently disclosed subject matter.

FIG. 2*a* is a non-limiting example of an output device 150 displaying visualizations of the acquired real-world data 110 and virtual entity (e.g. virtual entity A 130-*a*, virtual entity B 130-*b*, virtual entity C 130-*c*) visualizations, before a manipulation of the virtual entity visualizations by the mixed reality system. FIG. 2*a* depicts visualizations of real-world object A' 120-*a*' and real-world object B' 120-*b*' which are visualizations of real-world object A 120-*a* and real-world object B 120-*b* (respectively) after being affected by (a) one or more parameters of the data acquisition device 140 affecting the readings of real-world object A 120-*a* and real-world object B 120-*b*, and/or (b) the communication link that is used to communicate the readings of real-world object A 120-*a* and real-world object B 120-*b* from the data acquisition device 140 to the output device 150, and/or (c) by the one or more algorithms and/or other processing employed on the readings of real-world object A 120-*a* and real-world object B 120-*b*.

FIG. 2*a* also depicts visualizations of virtual entity A 130-*a* before a manipulation of the visualizations of virtual entity A 130-*a* by the mixed reality system. Before the manipulation of the visualizations of virtual entity A 130-*a* the effects of (a) the one or more parameters of the data acquisition device 140 affecting the acquired real-world data 110, and/or (b) the one or more algorithms and/or other processing employed on the readings of the acquired real-world data 110, and/or (c) the communication link that is used to communicate the acquired real-world data 110 from the data acquisition device 140 to the output device 150—are not taken into consideration.

This means that before the manipulation of the visualizations of virtual entities, the virtual entities visualizations are output to the output device 150, in a way that is perceived to be different than the real-world visualizations due to the fact that the virtual entities visualizations are not affected by the same effects that affect the real-world visualizations.

Continuing our non-limiting example, data acquisition device 140 is an infrared sensor with a certain noise model parameter, the noise model characterizing readings of the data acquisition device 140. Real-world object A' 1204 and real-world object B' 120-*b*' are visualizations of real-world object A 120-*a* and real-world object B 120-*b* (respectively) as affected by the noise model. Before a manipulation of the visualization of virtual entity A 130-*a* by the mixed reality system, the visualization of virtual entity A 130-*a* does not reflect the effects of the noise model of the data acquisition device 140. In some cases, this can result with a user of the mixed reality system, looking at output device 150 and distinguishing a virtual entity A 130-*a* from real-world object A' 1204 and real-world object B' 120-*b*'. This can be a problematic result for mixed reality systems that aim to seamlessly integrate virtual entities (e.g. virtual entity A 130-*a*, virtual entity B 130-*b*, virtual entity C 130-*c*).

It is to be noted that although FIG. 2*a* exemplifies the problem in the visual domain, the same problem exists in the sound domain where the mixed reality system is required to deal with both real-world sounds and virtual sounds, and make sure that any manipulation that occurs on the real-world sounds will take effect also on the virtual sounds.

FIG. 2*b* continues the non-limiting example of an output device 150 displaying visualizations of the acquired real-world data 110 and virtual entity (e.g. virtual entity A 130-*a*, virtual entity B 130-*b*, virtual entity C 130-*c*) visualizations, after a manipulation of the virtual entity visualizations by the mixed reality system. The manipulation of the visualizations of virtual entities takes into consideration, by calculating and/or simulating the way that the effects (of (a) the one or more parameters of the data acquisition device 140, and/or (b) the one or more algorithms and/or other processing employed on the readings of the acquired real-world data 110, and/or (c) the communication link that is used to communicate the acquired real-world data 110 from the data acquisition device 140 to the output device 150) affect the visualizations of virtual entities to produce manipulated visualizations of virtual entities.

Continuing our non-limiting example, visualization of virtual entity A' 1304 is a manipulation of the visualization of virtual entity A 130-*a* by the mixed reality system, that reflect the effect of the noise model of the data acquisition device 140, thus a user of the mixed reality system, looking at output device 150 will not be able to easily identify that virtual entity A' 130-*a*' is a virtual entity and not a real-world object like real-world object A' 120-*a*' and real-world object B' 120-*b*'.

It is to be noted that although FIG. 2*b* exemplifies a solution in the visual domain, the same solution is applicable also to the sound domain where the mixed reality system is required to make sure that any manipulation that occurs on the real-world sounds will take effect also on the virtual sounds.

FIG. 3*a* depicts a non-limiting example of the output device 150 displaying the acquired real-world data 110 acquired by the data acquisition device 140 without the effects of the virtual entities (e.g. virtual entity A 130-*a*, virtual entity B 130-*b*, virtual entity C 130-*c*) on the data. FIG. 3*a* illustrates the visualizations of the acquired real-world data 110 as outputted on output device 150 without manipulating the visualizations of the acquired real-world data 110 in accordance with simulated effects of the virtual entities. In our non-limiting example, data acquisition device 140 can be an infrared sensor. Real-world object A 120-*a* can be a car emitting a first level of infrared radiation. Real-world object B 120-*b* can be a car emitting a second level of infrared radiation. The infrared sensor samples the infrared radiation and a visualization relating to the level of sampled infrared radiation of real-world object A 120-*a* and real-world object B 120-*b* are displayed on output device 150.

It is to be noted that although FIG. 3*a* exemplifies the problem in the visual domain, the same problem exists also in the sound domain where sounds are not manipulated in accordance with simulated effects of the virtual entities.

FIG. 3*b* depicts a non-limiting example of determining, by the mixed reality system, the simulated effects of virtual entities (e.g. virtual entity A 130-*a*, virtual entity B 130-*b*, virtual entity C 130-*c*) on the acquired real-world data 110 acquired by the data acquisition device 140, and specifically on the resulting visualization of the acquired real-world object A 120-*a* and real-world object B 120-*b*.

The mixed reality system needs to take into consideration simulated effects of the virtual entities (e.g. virtual entity A 130-*a*, virtual entity B 130-*b*, virtual entity C 130-*c*) on the data acquisition device 140 (e.g. a physical sensor, a radio receiver, etc.), and/or on the acquired real-world data 110 and on the resulting visualization of the acquired real-world data 110 as outputted to the output device 150. The simulated effects can be determined by the mixed reality system based on properties of the virtual entities and/or on the properties of the data acquisition device 140 and/or on the properties of the resulting visualization of the acquired real-world data 110 as outputted to the output device 150. For example, data acquisition device 140 can be a radar, that is part of the mixed reality system. The radar can have temporary restricted coverage because of an interference from a virtual entity. In another example, data acquisition device 140 can be a thermal sensor blinded (or otherwise affected) by a virtual heat effect coming from virtual entities that are in an area viewed by the sensor or are located so that they affect the area viewed by the sensor. In yet another example, data acquisition device 140 is be a real-world radio receiver that cannot receive radio signals in a given channel due to a virtual entity that is a radio source transmitting a virtual radio signal in the given channel.

Furthermore, continuing our non-limiting example, virtual entity A 130-a, virtual entity B 130-b and virtual entity C 130-c can be heat sources (e.g. fires, explosions, etc.) with certain parameters. Mixed reality system can determine simulated effects (e.g. simulated effect A 310-a, simulated effect B 310-b, simulated effect C 310-c) of virtual entity A 130-a, virtual entity B 130-b and virtual entity C 130-c within certain radiuses distance from each of the virtual entities. Specifically, real-world object A 120-a and real-world object B 120-b are affected by the simulated effects (denoted in FIG. 3b by the thickness of the line of real-world object A 120-a and real-world object B 120-b— the thicker the line the more that part is affected by the simulated effect), thus the mixed reality system can determine the simulated infrared radiation emitted from parts of real-world object A 120-a and real-world object B 120-b as a consequence of the simulated effects. In our example, due to its location with respect to the virtual entities, parts of real-world object B 120-b are affected by both simulated effect A 310-a and simulated effect B 310-b. This part is symbolled by a thicker line of real-world object B 120-b.

It is to be noted that although FIG. 3b exemplifies a solution in the visual domain, the same solution is applicable also to the sound domain where the mixed reality system is required to take into account simulated effects of the virtual entities on the data acquisition device 140 (e.g. a physical sensor, a radio receiver, etc.), and/or on the acquired real-world data 110 and on the resulting visualization of the acquired real-world data 110 as outputted to the output device 150.

Figure 3C:
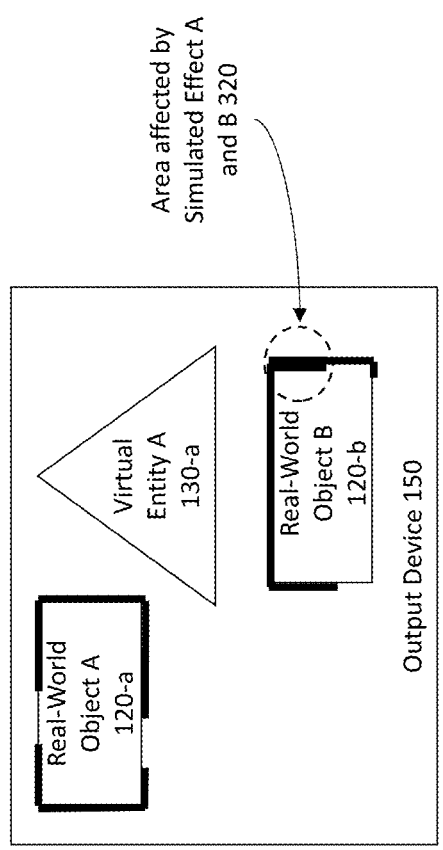
FIG. 3c is a schematic illustration of an example of an output device displaying data acquired by a data acquisition device with effects of the virtual entities on the data and virtual entities, in accordance with the presently disclosed subject matter.

FIG. 3c depicts a non-limiting example of the output provided to a user of the mixed reality system on the output device 150, displaying a manipulation of the acquired real-world data 110 acquired by the data acquisition device 140 with the simulate effects of the virtual entities (e.g. virtual entity A 130-a, virtual entity B 130-b, virtual entity C 130-c) on the visualization of the acquired real-world data 110 (specifically on the visualizations of real-world object A 120-a and real-world object B 120-b) and visualization of virtual entity A 130-a that is located within the area of the acquired real-world data 110. Continuing our non-limiting example, the manipulation of the visualization of real-world object A 120-a and real-world object B 120-b is determined by the mixed realty system based on the heat effects of the simulated effects (e.g. simulated effect A 310-a, simulated effect B 310-b, simulated effect C 310-c) on the amount of infrared radiation emitting from real-world object A 120-a and real-world object B 120-b.

In addition, the manipulation can be determined based on parameters of the data acquisition device 140. Continuing out non-limiting example, the infrared sensor can have a flooding point parameter, determining the maximal amount of infrared radiation the sensor can work with. If the sensor reads an amount of infrared radiation that is higher—it is blinded. In our example, the simulated effects (e.g. simulated effect A 310-a, simulated effect B 310-b, simulated effect C 310-c) can bring the amount of infrared radiation to blind the sensor and thus the mixed reality system will output a blind-out screen on the output device 150.

Figure 4:
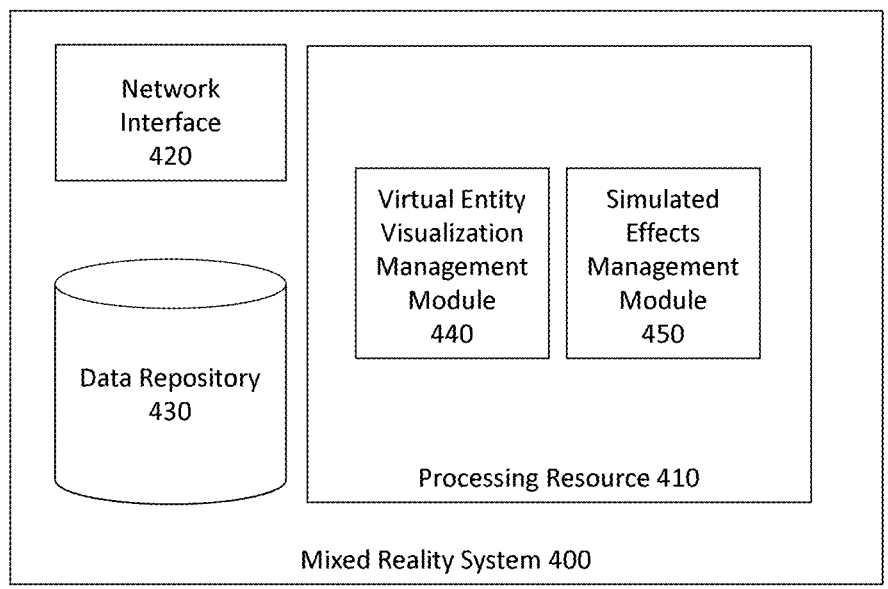
FIG. 4 is a block diagram schematically illustrating one example of a mixed reality system, in accordance with the presently disclosed subject matter.

Turning to FIG. 4, there is shown is a block diagram schematically illustrating one example of a mixed reality system, in accordance with the presently disclosed subject matter.

According to certain examples of the presently disclosed subject matter, mixed reality system 400 can comprise, or be otherwise associated with, a data repository 430 (e.g. a database, a storage system, a memory including Read Only Memory—ROM, Random Access Memory—RAM, or any other type of memory, etc.) configured to store data, including, inter alia, information of one or more virtual entities (e.g. virtual entity A 130-a, virtual entity B 130-b, virtual entity C 130-c) including their properties, information regarding parameters of the data acquisition device 140, information of one or more algorithms, information of communication links, etc. Data repository 430 can be further configured to enable retrieval and/or update and/or deletion of the stored data. It is to be noted that in some cases, data repository 430 can be distributed, while the mixed reality system 400 has access to the information stored thereon, e.g. via a wired or wireless network to which mixed reality system 400 is able to connect to.

Mixed reality system 400 may further comprise a network interface 420 (e.g. a network card, a WiFi client, a LiFi client, 3G/4G client, or any other network connection enabling component), enabling mixed reality system 400 to communicate over a wired or wireless network with one or more data acquisition devices 140 and/or one or more output devices 150. In some cases, at least one of the connections are over the Internet.

Mixed reality system 400 further comprises a processing circuitry 410. Processing circuitry 410 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant mixed reality system 400 resources and for enabling operations related to mixed reality system 400 resources.

The processing circuitry 410 can comprise a virtual entity visualization management module 440 and a simulated effects management module 450.

Virtual entity visualization management module 440 can be configured to perform a virtual entity visualization process, as further detailed herein, inter alia with respect to FIGS. 5-8. Simulated effects management module 450 can be further configured to perform a simulated effects process, as further detailed herein, inter alia with respect to FIG. 9.

Figure 5:
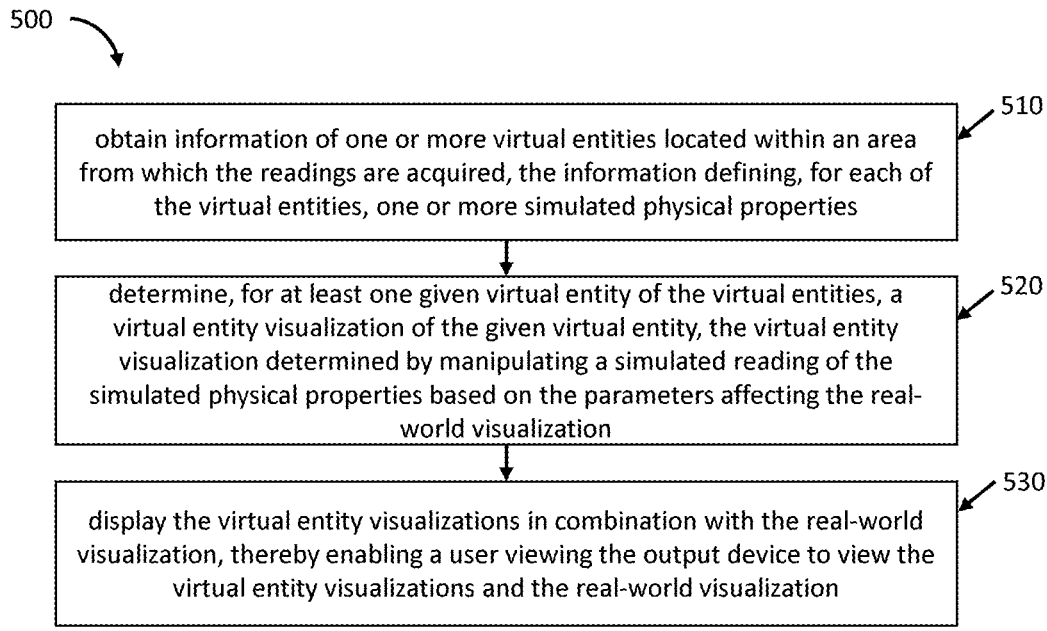
FIG. 5 is a flowchart illustrating one example of a sequence of operations carried out for virtual entity visualization management, in accordance with the presently disclosed subject matter.

Attention is drawn to FIG. 5, a flowchart illustrating one example of a sequence of operations carried out for virtual entity visualization management, in accordance with the presently disclosed subject matter.

According to certain examples of the presently disclosed subject matter, mixed reality system 400 can be configured to perform a virtual entity visualization process 500, e.g. utilizing the virtual entity visualization management module 440.

As detailed above, mixed reality system 400 can determine a manipulation on a visualization of virtual entities (e.g. virtual entity A 130-a, virtual entity B 130-b, virtual entity C 130-c) based on parameters of a data acquisition device 140 (e.g. noise model characterizing readings of the sensor, spectral sensitivity of the sensor, signal-to-noise ratio of the sensor, etc.). These parameters effect the visualization of readings of acquired real-world data 110, acquired by the data acquisition device 140. A non-limiting example, can be that data acquisition device 140 is an infrared sensor and one of its parameters in the noise model of the infrared sensor.

For this purpose, mixed reality system 400 can be configured to obtain information of one or more virtual entities (e.g. virtual entity A 130-a, virtual entity B 130-b, virtual entity C 130-c) located within an area from which the readings are acquired by data acquisition device 140, i.e. acquired real-world data 110 (block 510). These reading can contain readings of real-world objects (e.g. real-world object A 120-*a*, real-world object B 120-*b*, real-world object C 120-*c*, real-world object D 120-*d*) located within the area from which the readings are acquired. The obtained information defines for each of the virtual entities, one or more simulated physical properties of the virtual entities. In a non-limiting example, virtual entity A 130-*a* can be a virtual car located within the area from which acquired real-world data 110 is acquired, and a simulated physical property can be the engine temperature of the car. Mixed reality system 400 can use the information of the parameters of the data acquisition device 140 and the information about the virtual entities and their properties to determine virtual entity visualizations, as further detailed below.

Based on the obtained information, mixed reality system 400 can be configured to determine, for at least one given virtual entity of the virtual entities (e.g. virtual entity A 130-*a*, virtual entity B 130-*b*, virtual entity C 130-*c*), a virtual entity visualization. The virtual entity visualization is determined, by mixed reality system 400, by manipulating a simulated reading of the simulated physical properties of the virtual entity (e.g. one of: virtual entity A 130-*a*, virtual entity B 130-*b*, virtual entity C 130-*c*). The manipulation is determined based on parameters of data acquisition device 140, affecting the real-world visualization (block 520). Mixed reality system 400 is manipulating the virtual entity visualization so that it will go through a process similar to that of the real-world objects (e.g. real-world object A 120-*a*, real-world object B 120-*b*, real-world object C 120-*c*, real-world object D 120-*d*) making the virtual entity visualization more realistic to a user of the mixed reality system 400. Continuing our non-limiting example, the visualization of virtual entity A 120-*a*, which is a car, will be manipulated to take into consideration the effect of the noise model of the data acquisition device 140, which is an infrared sensor. This will make the visualization of the virtual car more realistic when presented to the user of mixed reality system 400.

In addition, mixed reality system 400 can manipulate the visualization of the virtual entities (e.g. virtual entity A 130-*a*, virtual entity B 130-*b*, virtual entity C 130-*c*) to take into consideration also one or more algorithms, employed on the readings of the real-world data. A non-limiting example of an algorithm can be an image sharpening algorithm. In order for the visualization of the virtual entity to look as closest to a real-world object (e.g. real-world object A 120-*a*, real-world object B 120-*b*, real-world object C 120-*c*, real-world object D 120-*d*), the same or similar algorithm employed on real-world objects is employed on the virtual entities.

In some cases, the parameters of data acquisition device 140 affect the real-world visualization by affecting the readings of the acquired real-world data 110. In these cases, the parameters can include one or more of: a noise model characterizing readings of the sensor, a spectral sensitivity of the sensor, a spectral response of the sensor, a saturation of the sensor, a dynamic range of the sensor, a dark noise of the sensor, a signal-to-noise ratio of the sensor, a detection limit of the sensor, a photo response non uniformity of the sensor, a penetration depth of the sensor, a lens distortion of the sensor, an optical deformation model of the sensor, a vignetting model of the sensor, response to different exposure levels of the sensor, a resolution map of the readings acquired by the sensor, etc.

In some cases, mixed reality system 400 can manipulate the visualization of the virtual entities (e.g. virtual entity A 130-*a*, virtual entity B 130-*b*, virtual entity C 130-*c*) by partially employing the processes, the algorithms and/or the parameters of the data acquisition device 140 that affect the real-world visualization.

In some cases, mixed reality system 400 can manipulate the visualization of the virtual entities (e.g. virtual entity A 130-*a*, virtual entity B 130-*b*, virtual entity C 130-*c*) to imitate visualization of readings of the acquired real-world data 110. This can be done not by putting the visualization of the virtual entities through a process similar to that of the real-world objects (e.g. real-world object A 120-*a*, real-world object B 120-*b*, real-world object C 120-*c*, real-world object D 120-*d*), but by analyzing the visualization of readings of the acquired real-world data 110 and manipulate the visualization of the virtual entities to imitate them. For example: if visualization of readings of the acquired real-world data 110 are darker at night, mixed reality system 400 can manipulate the visualization of the virtual entities to seem darker at night time as well.

Mixed reality system 400 can be configured to display the virtual entity visualizations in combination with the real-world visualization. This allows the user of mixed reality system 400 viewing the output device 150 to see the manipulated virtual entity visualizations and the real-world visualization together (block 530). Continuing our non-limiting example, output device 150 can display a visualization of a real-world car (as actually acquired by the sensor) and a visualization of the virtual car, manipulated to take into consideration the effects of the parameters of the sensor. This will create a visualization of the virtual entity (e.g. one of: virtual entity A 130-*a*, virtual entity B 130-*b*, virtual entity C 130-*c*) as close as possible to visualizations of the real-world objects (e.g. real-world object A 120-*a*, real-world object B 120-*b*, real-world object C 120-*c*, real-world object D 120-*d*). In some cases, the user of mixed reality system 400 will not be able to easily identify that virtual car is a virtual entity and not a real-world car.

In some cases, the virtual entity visualizations are displayed by (a) injecting the virtual entity visualizations into the output device 150, or (b) by displaying the virtual entity visualizations on a see-through output device overlaying the output device 150, or (c) by projecting the virtual entity visualizations on the real-world visualization. In these cases, the virtual entity visualizations are provided to the output device 150 through a communication channel that is different from the communication channel through which the real-world visualizations are provided to the output device 150. Thus, the virtual entity visualizations are not affected as the real-world visualizations are affected. It is to be noted that in some cases the acquired real-world data 110 undergoes processing during its communication from the data acquisition device 140 to the output device 150 through communication channel.

The resulting virtual entity visualization will be perceived closer to a visualization of a given virtual entity had it been a real-world entity having physical properties similar to the simulated physical properties than an alternative visualization of the same given virtual entity generated without manipulating the simulated reading of the simulated physical properties based on the parameters affecting the readings of the data acquisition device 140.

It is to be noted that, with reference to FIG. 5, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Figure 6:
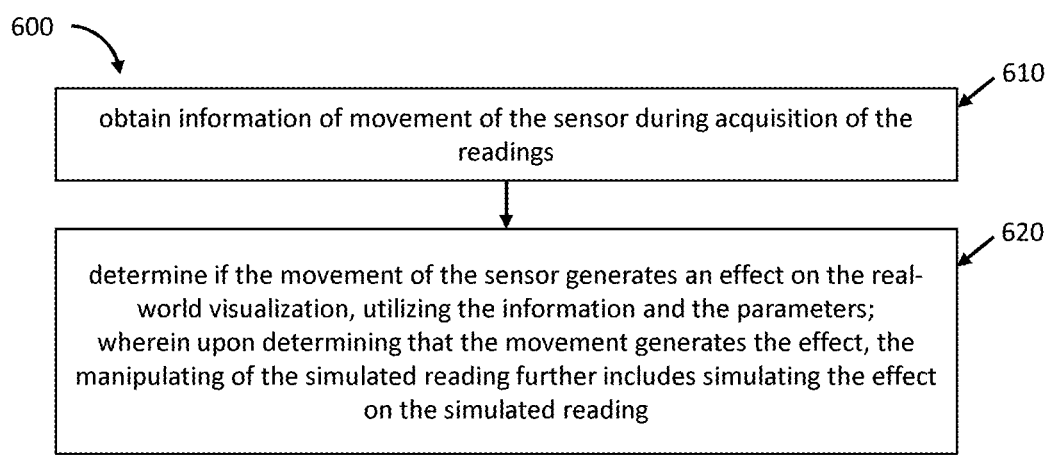
FIG. 6 is a flowchart illustrating one example of a sequence of operations carried out for virtual entity visualization management with actual sensor movement information, in accordance with the presently disclosed subject matter.

Attention is drawn to FIG. 6, a flowchart illustrating one example of a sequence of operations carried out for virtual entity visualization management with actual sensor movement information, in accordance with the presently disclosed subject matter.

According to certain examples of the presently disclosed subject matter, mixed reality system 400 can be configured to perform a virtual entity visualization process with actual sensor movement information 600, e.g. utilizing the virtual entity visualization management module 440.

As detailed above, mixed reality system 400 can determine a manipulation on a visualization of virtual entities (e.g. virtual entity A 130-a, virtual entity B 130-b, virtual entity C 130-c) based on parameters of a data acquisition device 140. Mixed reality system 400 can further determine the manipulation also based on information of movement of the data acquisition device 140.

For this purpose, mixed reality system 400 can be configured, before performance of block 530 of virtual entity visualization process 500, to further obtain information of movement of the data acquisition device 140 during acquisition of the readings (block 610). It is to be noted that the movement of the data acquisition device 140 can be caused in some cases by movement of the data acquisition device 140 itself and/or by a movement of a platform to which data acquisition device 140 is connected thereto. In a non-limiting example, data acquisition device 140 can be a camera. In case the camera moves during data acquisition, the information about the movement is obtained by mixed reality system 400. The movement can be caused by an operator moving the camera itself or rotating the camera, thus changing the camera's viewing angel, or in other cases, by an operator moving a platform to which the camera is connected. In some cases, the camera may be connected to a moving platform and the camera itself can move while the platform is also moving.

After obtaining the information of movement of the data acquisition device 140, if any, mixed reality system 400 can be configured to determine if the movement of the data acquisition device 140 generates a movement effect on the real-world visualization, utilizing the information and the parameters.

The movement effect can include effects on an image the sensor produces. This image effect happens when the rate of movement of the data acquisition device 140 is higher than the image actuation rate, thus the objects in the image be blurred or if a video is created the objects can seem to "jump" between frames, as the rate of change of the line of sight of the data acquisition device 140 is higher than the rendering rate of the video. In addition, movement effects can include in addition effects issuing from vibrations of the data acquisition device 140 in one or more axis.

In some cases, the movement effect can be determined by utilizing look-up-tables that determine a transformation function to be used to determine the movement effect for each value range of movement of the sensor.

If so determined, mixed reality system 400, can further manipulate the simulated reading to further include simulating the movement effect on the simulated reading (block 620). This determination can be achieved by utilizing a simulated model of the data acquisition device 140, simulating how data acquisition device 140 is affected by its own movement.

Continuing our non-limiting example, the movement of the camera during data acquisition creates an effect. Mixed reality system 400 will manipulate visualizations of virtual entities (e.g. virtual entity A 130-a, virtual entity B 130-b, virtual entity C 130-c) in the area of the acquired real-world data 110 to simulate the movement effect. In some cases, mixed reality system 400 calculates the movement effect for the visualizations of all virtual entities (e.g. virtual entity A 130-a, virtual entity B 130-b, virtual entity C 130-c) and can employ the effect on the visualizations of virtual entities that are in the area of the acquired real-world data 110 to simulate the movement effect. Thus, a user of mixed reality system 400 will perceive the virtual visualization as he would perceive a similar real-world object (e.g. real-world object A 120-a, real-world object B 120-b, real-world object C 120-c, real-world object D 120-d).

It is to be noted that, with reference to FIG. 6, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Figure 7:
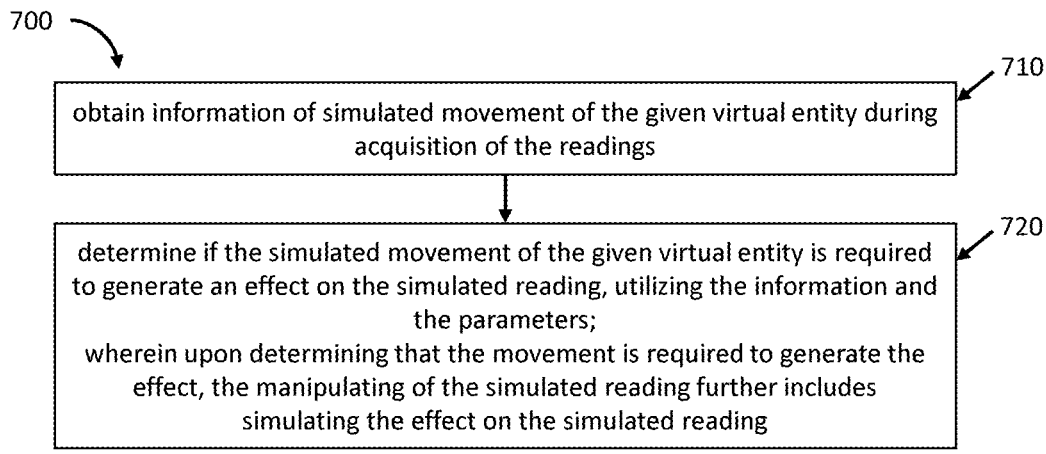
FIG. 7 is a flowchart illustrating one example of a sequence of operations carried out for virtual entity visualization management with simulated movement information, in accordance with the presently disclosed subject matter.

FIG. 7 is a flowchart illustrating one example of a sequence of operations carried out for virtual entity visualization management with simulated movement information, in accordance with the presently disclosed subject matter.

According to certain examples of the presently disclosed subject matter, mixed reality system 400 can be configured to perform a virtual entity visualization process with simulated movement information 700, e.g. utilizing the virtual entity visualization management module 440.

As detailed above, mixed reality system 400 can determine a manipulation on a visualization of virtual entities (e.g. virtual entity A 130-a, virtual entity B 130-b, virtual entity C 130-c) based on parameters of a data acquisition device 140. Mixed reality system 400 can further determine the manipulation also based on information of simulated movement of the given virtual entity (e.g. one of: virtual entity A 130-a, virtual entity B 130-b, virtual entity C 130-c) during acquisition of the readings by data acquisition device 140.

For this purpose, mixed reality system 400 can be configured, before performance of block 530 of virtual entity visualization process 500, to further obtain information of simulated movement of the given virtual entity (e.g. one of: virtual entity A 130-a, virtual entity B 130-b, virtual entity C 130-c) during acquisition of the readings (block 710). In a non-limiting example, data acquisition device 140 can be a camera and virtual entity A 130-a is a car that can be determined, according to the parameters of the camera and/or according to the parameters of the virtual car, to be moving during the acquisition of the readings by the data acquisition device 140. The information about the simulated movement of virtual entity A 130-a is obtained by mixed reality system 400.

After obtaining the information of the simulated movement of the given virtual entity (e.g. one of: virtual entity A 130-a, virtual entity B 130-b, virtual entity C 130-c), if any, mixed reality system 400 can be configured to determine if the simulated movement of the given virtual entity is required to generate an effect on the simulated reading, utilizing the information and the parameters. If so determined, mixed reality system 400, can further manipulate the simulated reading to further include the simulated effect (block 720).

In some cases, the determination if the simulated movement of the given virtual entity is required to generate an effect on the simulated reading can be done by utilizing look-up-tables that determine a transformation function to be used to determine the effect for each value range of movement of the given virtual entity.

The determination if the simulated movement of the given virtual entity is required to generate an effect on the simulated reading can be done by utilizing a simulation model. The simulation model simulates how data acquisition device 140 behaves when acquired real-world data 110 is moving while acquired by data acquisition device 140. The simulated movement of the given virtual entity is used together with the simulation model to determine the effect on the simulated reading. For example: data acquisition device 140 can be a camera. When this camera acquires real-world data 110 that is moving, the movement produces a smear effect on the visualizations of the real-world objects (e.g. real-world object A 120-*a*, real-world object B 120-*b*, real-world object C 120-*c*, real-world object D 120-*d*) by the camera. Mixed reality system 400 can use a simulation model of the camera to create the same smear effect on the simulated readings. In another non-limiting example, data acquisition device 140 can be a radar and the radar lock can be lost when the tracked object is in movement. Another non-limiting example acquisition device 140 can be a datalink, and the communication devices can suffer from limited communication or cutoff from the datalink due to their movement.

Continuing our non-limiting example, the movement of the virtual car during data acquisition creates a simulated effect. Mixed reality system 400 can manipulate visualizations of virtual entities (e.g. virtual entity A 130-*a*, virtual entity B 130-*b*, virtual entity C 130-*c*) in the area of the acquired real-world data 110 to include the simulated effect. Thus, a user of mixed reality system 400 will perceive the virtual visualization as he would perceive a similar real-world object (e.g. real-world object A 120-*a*, real-world object B 120-*b*, real-world object C 120-*c*, real-world object D 120-*d*). It is to be noted that, with reference to FIG. 7, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Figure 8:
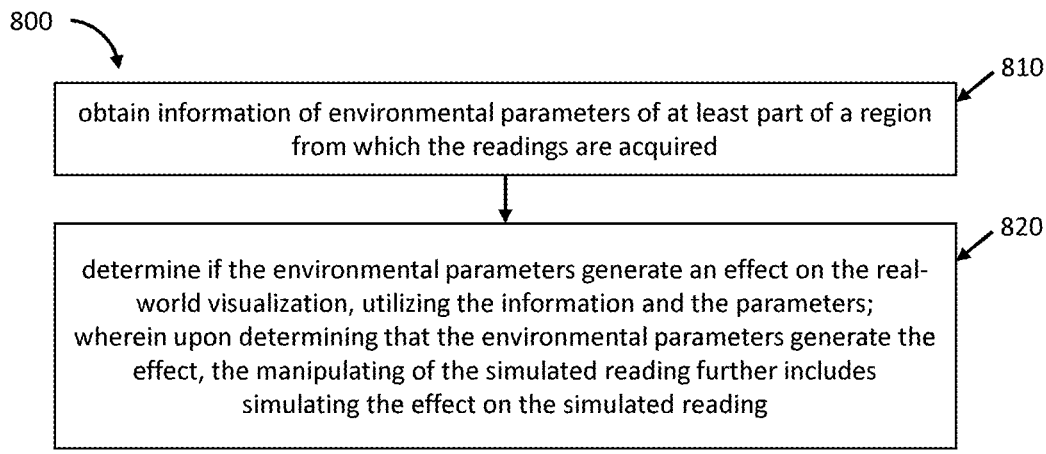
FIG. 8 is a flowchart illustrating one example of a sequence of operations carried out for virtual entity visualization management with environmental parameters information, in accordance with the presently disclosed subject matter.

Attention is drawn to FIG. 8, a flowchart illustrating one example of a sequence of operations carried out for virtual entity visualization management with environmental parameters information, in accordance with the presently disclosed subject matter.

According to certain examples of the presently disclosed subject matter, mixed reality system 400 can be configured to perform a virtual entity visualization process with environmental parameters information 800, e.g. utilizing the virtual entity visualization management module 440.

As detailed above, mixed reality system 400 can determine a manipulation on a visualization of virtual entities (e.g. virtual entity A 130-*a*, virtual entity B 130-*b*, virtual entity C 130-*c*) based on parameters of a data acquisition device 140. Mixed reality system 400 can further determine the manipulation also based on information of environmental parameters of at least part of a region from which acquired real-world data 110 is acquired, during acquisition of the readings by data acquisition device 140.

For this purpose, mixed reality system 400 can be configured, before performance of block 530 of virtual entity visualization process 500, to further obtain information of environmental parameters of at least part of a region from which the readings are acquired during acquisition of the readings (block 810). In a non-limiting example, data acquisition device 140 can be a camera and the environmental parameters can be the temperature in the region from which the readings are acquired at the time of acquisition of the readings.

After obtaining the information of the environmental parameters, mixed reality system 400 can be configured to determine if the environmental parameters generate an environmental effect on the real-world visualization, utilizing the information and the parameters. If so determined, mixed reality system 400, can further manipulate the simulated reading to further include simulating the environmental effect (block 820). Continuing our non-limiting example, mixed reality system 400 will manipulate visualizations of virtual entities (e.g. virtual entity A 130-*a*, virtual entity B 130-*b*, virtual entity C 130-*c*) in the area of the acquired real-world data 110 to include an environmental effect of the temperature on the way he camera works. Thus, a user of mixed reality system 400 will perceive the virtual visualization as he would perceive a similar real-world object (e.g. real-world object A 120-*a*, real-world object B 120-*b*, real-world object C 120-*c*, real-world object D 120-*d*).

According to certain examples of the presently disclosed subject matter, mixed reality system 400 can be further configured to obtain values of one or more situational parameters indicative of a state of the sensor during acquisition of the readings. The virtual entity visualization can be determined also based on the values of the situational parameters.

In these cases, data acquisition device 140 can be a sensor and the situational parameters can include a temperature of the sensor and/or its surroundings, a vibration frequency of the sensor, a type of platform the sensor is connected to, a velocity of the platform the sensor is connected to, a topography the platform the sensor is connected to is in; or any other parameter indicative of the state of the sensor during acquisition of the readings.

The situational parameters can be readings of one or more situational sensors, sensing the state of the sensor and/or its surroundings. For example: a temperature situational sensor can sense the temperature of the sensor and/or its surroundings.

Figure 10A:
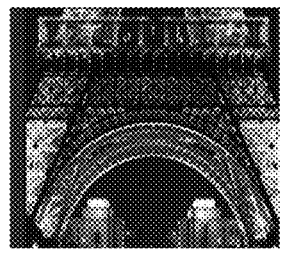
FIG. 10a is a depiction of virtual entity visualization of part of the Eiffel tower without taking into consideration the vibration of the sensor.
Figure 10B:
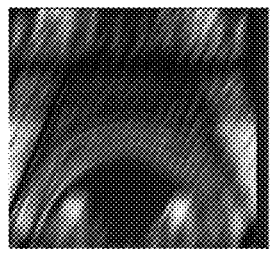
FIG. 10b is a depiction of the same virtual entity visualization of part of the Eiffel tower where the vibration of the sensor is also used to determine the virtual entity visualization.

Another example can be an Inertial Measurement Unit (IMU) situational sensor that can sense the vibration frequency of the sensor and/or the vibration of the sensor within a coordination system. In this case, the virtual entity visualization can be determined according to vibration frequency and/or vibration of the sensor within a coordination system information in order to imitate real-world objects visualizations. In a non-limiting example, wherein the sensor is a camera, FIG. 10*a* is a depiction of virtual entity visualization of part of the Eiffel tower without taking into consideration the vibration of the sensor. FIG. 10*b* is a depiction of the same virtual entity visualization of part of the Eiffel tower where the vibration of the sensor is also used to determine the virtual entity visualization.

Figure 11:
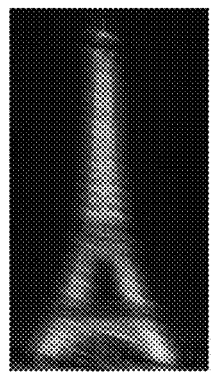
FIG. 11 depicts an image taken of the Eiffel tower by the sensor.

In some cases, at least part of the situational parameters can be deducted from analysis of readings of the sensor. In a non-limiting example, wherein the sensor is a camera, FIG. 11 depicts an image taken of the Eiffel tower by the sensor. The mixed reality system 400 can calculate distortions based on image analysis and deduce at least some of the situational parameters. The virtual entity visualizations can then be determined also based on the deduced situational parameters.

A non-limiting example of the way the situational parameters are also used to determine the virtual entity visualizations can be by using prearranged look-up-tables. These look-up-tables can be determined during calibration process of the sensor or based on the sensor's manufacturer data. FIG. 12a depicts a non-limiting example of a look-up-table for temperature distortions of the sensor. For each measured temperature of the sensor and/or its surroundings, the look-up-table entry is associated with a transformation function (transformation functions A, B or C) used to determine the entity visualization. FIG. 12b depicts a non-limiting example of a look-up-table for types of topographies the platform the sensor is connected to is in and the transformation functions associated with each type of topography. FIG. 12c depicts a non-limiting example of a look-up-table for values of measured velocity of the sensor (or of the platform the sensor is connected to) and the transformation functions associated with the velocity readings. FIG. 12d depicts a non-limiting example of a look-up-table for types and sub-types of platforms the sensor is connected to and the transformation functions associated with each type and sub-type of platform.

A non-limiting example of using multiple look-up-tables to determine the virtual entity visualizations is depicted in FIG. 12e. In the example of FIG. 12e the sensor is connected to a platform of type "APC" and the sensor type is "CMOS type" and the velocity of the sensor is "50" and the topography where the platform the sensor is connected to is a "Road" and the temperature of the sensor is "10" thus multiple distortion function (in this example: distortion function LL, L, M, AB and B) are used to determine the virtual entity visualizations.

It is to be noted that, with reference to FIG. 8, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be noted that in some cases, mixed reality system 400 can be further configured to obtain values of one or more situational parameters indicative of a state of the data acquisition device 140 during acquisition of the readings. The virtual entity visualization can be determined also based on the values of the situational parameters. This can be done by determining situational effects on the readings of the data acquisition device 140 based on the situational parameters. For example: when the data acquisition device 140 is vibrating, the readings will be affected accordingly. The determination of the virtual entity visualization takes the situational effects on the data acquisition device 140 into account.

In some cases, data acquisition device 140 can be a sensor and the situational parameters can include a temperature of the sensor and/or its surroundings, a vibration frequency of the sensor, a type of platform the sensor is connected to, a velocity of the platform the sensor is connected to, a topography the platform the sensor is connected to is in; or any other parameter indicative of the state of the sensor during acquisition of the readings.

The situational parameters can be readings of one or more situational sensors, sensing the state of the sensor and/or its surroundings. For example: a temperature situational sensor can sense the temperature of the sensor and/or its surroundings. An example can be an Inertial Measurement Unit (IMU) situational sensor that can sense the vibration frequency of the sensor and/or the vibration of the sensor within a coordination system (e.g. the vibration of the sensor in length (X plane), height (Y plane) and depth (Z plane) planes).

In some cases, the vibrations of the sensor are caused by the movement of the platform the sensor is installed on. For example: a camera installed on a moving vehicle can vibrate because of the movement of the vehicle.

The IMU can be part of the sensor itself and/or installed on the sensor. The IMU can alternatively be installed on the platform that the sensor is connected to, for example: the sensor is installed on a vehicle and the IMU is installed on the same vehicle in a location allowing the IMU to sense the vibration of the sensor. In other cases, the IMU can be installed in a location that allows it to sense the vibration of the sensor, for example: installed on a second platform, different from the platform that the sensor is installed on, that is in a proximity of the sensor, allowing for the measurement of the sensor's vibrations by the IMU. In these cases, the virtual entity visualization can be determined according to vibration frequency and/or vibration measurement of the sensor within a coordination system in order to imitate real-world objects visualizations. When the IMU senses the sensor's field-of-view vibrating in a certain X-Y-Z measurement, this certain vibration will be projected on the virtual entity visualization by determining it to be vibrating in the same X-Y-Z measurement.

In a non-limiting example, wherein the sensor is a camera, FIG. 10a is a depiction of a scene that is in the field-of-view acquired by the camera. In our example, a scene with the Eiffel tower in the background. The sensor is vibrating and an IMU is measuring the vibration. FIG. 10b includes a depiction of the same scene depicted in FIG. 10a, but the image is distorted due to the vibrations of the camera. FIG. 10b also includes a virtual entity visualization 1010, which in our example is a virtual cross, that is overlaid on the scene. Virtual entity visualization 1010 is overlaid on the Eiffel tower scene without taking into consideration the vibration of the sensor. FIG. 10c is a depiction of the same scene, wherein virtual entity visualization 1020 is the visualization of virtual entity visualization 1010 determined by taking into consideration the vibration of the sensor. For example, when the camera is vibrating in the X and Y planes, the properties of the vibrations are sensed by the IMU and applied to the visualization of virtual entity visualization 1020 in order to imitate real life conditions, thus virtual entity visualization 1020 is a manipulation on virtual entity visualization 1010 to include the effect of the vibration of the camera in the X and Y planes.

In some cases, at least part of the situational parameters can be deducted from analysis of readings of the sensor. In a non-limiting example, wherein the sensor is a camera, FIG. 11 depicts an image taken of the Eiffel tower by a vibrating sensor. The mixed reality system 400 can calculate distortions based on image analysis and deduce at least some of the situational parameters. In our example, a small region-of-interest 1110 out of the entire scene is analyses to indicate the level of vibrations by calculating gradient properties that indicate the sharpness/blurry level of the image within region-of-interest 1110. The virtual entity visualizations can then be determined also based on the deduced situational parameters and generated accordingly. In our example, the virtual entity visualizations are generated using the same gradient parameters deducted from the analysis of region-of-interest 1110.

It is to be noted that other image analysis methods are also available. A non-limiting example of the way the situational parameters are also used to determine the virtual entity visualizations can be by using prearranged look-up-tables. These look-up-tables can be determined during calibration process of the sensor or based on the sensor's manufacturer data. FIG. 12*a* depicts a non-limiting example of a look-up-table for temperature distortions of the sensor. For each measured temperature of the sensor and/or its surroundings, the look-up-table entry is associated with a transformation function (transformation functions A, B, C or D) used to determine the wrappings and/or distortions of the virtual entity visualization. A non-limiting example can be of a measured temperature of the sensor of 20 degrees Celsius, thus the virtual entity visualizations will be generated using transformation function D. FIG. 12*b* depicts a non-limiting example of a look-up-table for types of topographies the platform the sensor is connected to is in and the transformation functions associated with each type of topography. FIG. 12*c* depicts a non-limiting example of a look-up-table for values of measured velocity of the sensor (or of the platform the sensor is connected to) and the transformation functions associated with the velocity readings. FIG. 12*d* depicts a non-limiting example of a look-up-table for types and sub-types of platforms the sensor is connected to and the transformation functions associated with each type and sub-type of platform.

A non-limiting example of using multiple look-up-tables to determine the virtual entity visualizations is depicted in FIG. 12*e*. In the example of FIG. 12*e* the sensor is connected to a platform of type "APC" and the sensor type is "CMOS type" and the velocity of the sensor is "50" and the topography where the platform the sensor is connected to is a "Road" and the temperature of the sensor is "10" thus multiple distortion function (in this example: distortion functions LL, L, M, AB and B) are used together to determine the virtual entity visualizations.

Figure 9:
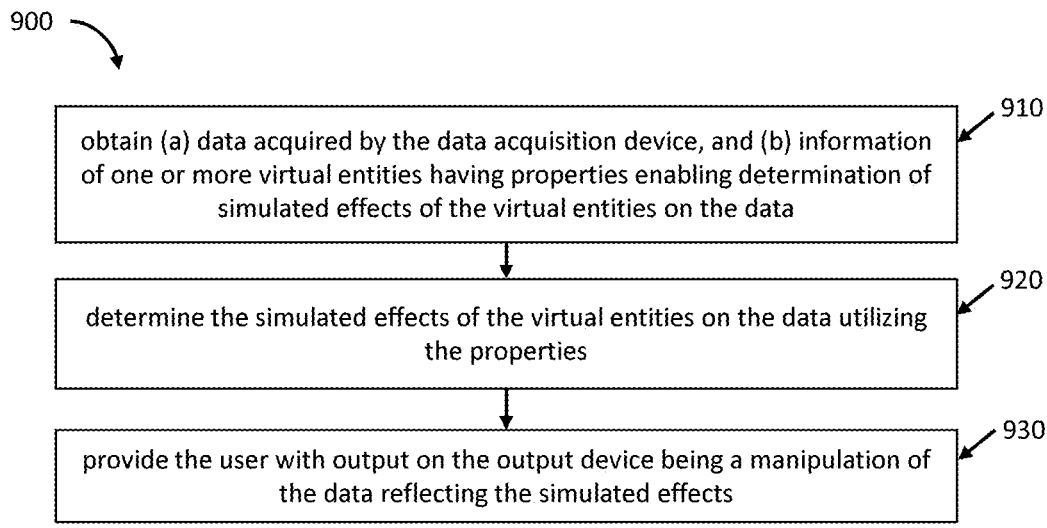
FIG. 9 is a flowchart illustrating one example of a sequence of operations carried out for simulated effects management, in accordance with the presently disclosed subject matter.

Attention is drawn to FIG. 9, a flowchart illustrating one example of a sequence of operations carried out for simulated effects management, in accordance with the presently disclosed subject matter.

According to certain examples of the presently disclosed subject matter, mixed reality system 400 can be configured to perform a simulated effects process 900, e.g. utilizing the simulated effects management module 450.

As detailed above, mixed reality system 400 can take into consideration simulated effects of the virtual entities (e.g. virtual entity A 130-*a*, virtual entity B 130-*b*, virtual entity C 130-*c*) on the data acquisition device 140 (e.g. a physical sensor, a radio receiver, etc.), on the acquired real-world data 110 and/or on the resulting sounds and/or visualization of the acquired real-world data 110 as outputted to the output device 150. The simulated effects can be determined by the mixed reality system based on properties of the virtual entities. In a non-limiting example, data acquisition device 140 can be a thermal sensor blinded (or otherwise affected) by a virtual heat effect coming from virtual entities that are in an area viewed by the sensor or are located so that they affect the area viewed by the sensor.

For this purpose, mixed reality system 400 can be configured to obtain data acquired by the data acquisition device 140, and information of one or more virtual entities (e.g. virtual entity A 130-*a*, virtual entity B 130-*b*, virtual entity C 130-*c*). These virtual entities have properties enabling mixed reality system 400 to determine the simulated effects of the virtual entities on the data (block 910). Continuing our non-limiting example, the obtained data is the acquired real-world data 110 acquired by the infrared sensor. The information is of virtual fires and their properties. These virtual fires are affecting the acquired real-world data 110.

It is to be noted that data acquisition device 140 can be a sensor or a radio receiver. In case data acquisition device 140 is a sensor, it can be one of the following: a camera, a radar, Night Vision Goggles (NVG), a proximity sensor, temperature sensor, an infrared sensor, pressure sensor, light sensor, touch sensor, ultrasonic sensor, color sensor, humidity sensor, tilt sensor, accelerometer, an acoustic sensor, or any other device with sensing capabilities.

It is to be noted that the simulated effects can be one or more of: virtual heat, virtual light, virtual touch, virtual shade, virtual sound, virtual topography, virtual smoke, virtual hit, virtual ice or any other effect.

In some cases, the data is acquired from a training environment, and the virtual entities (e.g. virtual entity A 130-*a*, virtual entity B 130-*b*, virtual entity C 130-*c*) are designed to simulate training scenarios.

After obtaining the data and the information, mixed reality system 400 can be further configured to determine the simulated effects of the virtual entities (e.g. virtual entity A 130-*a*, virtual entity B 130-*b*, virtual entity C 130-*c*) on the data, utilizing the properties of the virtual entities (block 920). The determination of the simulated effects of the virtual entities (e.g. virtual entity A 130-*a*, virtual entity B 130-*b*, virtual entity C 130-*c*) on the data can be done by utilizing a simulated model, simulating the way data acquisition device 140 is affected by the simulated effects. For example: data acquisition device 140 can be a thermal sensor that is "blinded" by a near-by virtual explosion, thus the output device 150 will be blank and display no data. Another example can be of a radio device that has less data capacity for receiving and transmitting data due to simulated effects of virtual entities and the data they create. In this example the radio device data rate will go down due to the load on the network created by virtual entities. In addition, the determination can be done by image analysis of an image displayed on output device 150. The analysis determines the real-world objects displayed and using the simulated model to determine the simulated effect on the data.

Continuing our non-limiting example, mixed reality system 400 determines the simulated effects of the virtual fire has on the acquired real-world data 110. In our example, the virtual fires simulate effect is to increase the amount of infrared radiation sampled from the acquired real-world data 110.

In addition, mixed reality system 400 can determine the simulated effects also utilizing one or more parameters of the sensor or the radio receiver. In case, the data acquisition device 140 is a radio receiver, the parameter can also be a load parameter that effects the data rate of the radio receiver. For example: a large number of virtual entities (e.g. virtual entity A 130-*a*, virtual entity B 130-*b*, virtual entity C 130-*c*) can increase the load and lower the data rate of the radio receiver.

Mixed reality system 400 can then be further configured to provide the user with output on the output device being a manipulation of the data reflecting the simulated effects (block 930). Continuing our non-limiting example, mixed reality system 400 can determine the simulated effects of the virtual fires have blinded the data acquisition device 140, and only a blind-out screen will be presented to the user of mixed reality system 400.

It is to be noted that, with reference to FIG. 9, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A mixed reality system, comprising:
   a sensor configured to acquire readings of real-world data, and display, on an output device, a real-world visualization of the real-world data based on the readings to a user, wherein the sensor has one or more parameters affecting the real-world visualization; and
   a processing circuitry configured to:
      obtain (a) information of one or more virtual entities located within an area from which the readings are acquired, the information defining, for each of the virtual entities, one or more simulated physical properties, and (b) values of one or more situational parameters indicative of a state of the sensor during acquisition of the readings, wherein the values of the one or more situational parameters are readings of one or more situational sensors, sensing the state of the sensor and its surroundings during acquisition of the readings;
      determine, for at least one given virtual entity of the virtual entities, a virtual entity visualization of the given virtual entity, the virtual entity visualization determined by manipulating a simulated reading of the simulated physical properties based on (a) the parameters affecting the real-world visualization, and (b) the values of the situational parameters, wherein the virtual entity visualization of the given virtual entity is perceived closer to a third visualization of the given virtual entity had it been a real-world entity having physical properties identical to the simulated physical properties than an alternative visualization of the given virtual entity determined without manipulating the simulated reading of the simulated physical properties based on the parameters affecting the readings of the sensor; and
      display the virtual entity visualizations in combination with the real-world visualization, thereby enabling a user viewing the output device to view the virtual entity visualizations and the real-world visualization.

2. The mixed reality system of claim 1, wherein: (a) the real-world visualization is provided to the output device via a first communication channel and the virtual entity visualizations are injected into the output device via a second communication channel other than the first communication channel, (b) the parameters affect the real-world visualization by affecting the first communication channel, and (c) the manipulating of the simulated reading further includes simulating communication effects of the first communication channel on the virtual entity visualizations.

3. The mixed reality system of claim 1, wherein the manipulating of the simulated reading further includes employing one or more algorithms, employed on the readings of the real-world data, also on the simulated reading.

4. The mixed reality system of claim 1, wherein the parameters affect the real-world visualization by affecting the readings.

5. The mixed reality system of claim 4, wherein the parameters include one or more of:
   a. a noise model characterizing readings of the sensor;
   b. a spectral sensitivity of the sensor;
   c. a spectral response of the sensor;
   d. a saturation of the sensor;
   e. a dynamic range of the sensor;
   f. a dark noise of the sensor;
   g. a signal-to-noise ratio of the sensor;
   h. a detection limit of the sensor;
   i. a photo response non uniformity of the sensor;
   j. a penetration depth of the sensor;
   k. a lens distortion of the sensor;
   l. an optical deformation model of the sensor;
   m. a vignetting model of the sensor;
   n. response to different exposure levels of the sensor; or
   o. a resolution map of the readings acquired by the sensor.

6. The mixed reality system of claim 1, wherein the processing circuitry is further configured to:
   obtain information of movement of the sensor during acquisition of the readings;
   determine if the movement of the sensor generates an effect on the real-world visualization, utilizing the information and the parameters;
   wherein upon determining that the movement generates the effect, the manipulating of the simulated reading further includes simulating the effect on the simulated reading.

7. The mixed reality system of claim 1, wherein the processing circuitry is further configured to:
   obtain information of simulated movement of the given virtual entity during acquisition of the readings;

determine if the simulated movement of the given virtual entity is required to generate an effect on the simulated reading, utilizing the information and the parameters;

wherein upon determining that the movement is required to generate the effect, the manipulating of the simulated reading further includes simulating the effect on the simulated reading.

8. The mixed reality system of claim 1, wherein the processing circuitry is further configured to:

obtain information of environmental parameters of at least part of a region from which the readings are acquired;

determine if the environmental parameters generate an effect on the real-world visualization, utilizing the information and the parameters;

wherein upon determining that the environmental parameters generate the effect, the manipulating of the simulated reading further includes simulating the effect on the simulated reading.

9. The mixed reality system of claim 1, wherein the situational parameters include one or more of:

a. a temperature of the sensor, wherein the one or more situational sensors include one or more temperature situational sensors that can sense the temperature of the sensor;

b. a vibration frequency of the sensor, wherein the one or more situational sensors include one or more Inertial Measurement Units (IMUs) that can sense the vibration frequency of the sensor; or c. a type of platform the sensor is connected to, wherein type of platform the sensor is connected is determined using a prearranged look-up-table.

10. A method comprising:

obtaining, by a processing circuitry, (a) information of one or more virtual entities located within an area from which readings are acquired by a sensor configured to acquire readings of real-world data, and display, on an output device, a real-world visualization of the real-world data based on the readings to a user, wherein the sensor has one or more parameters affecting the real-world visualization, and wherein the information defining, for each of the virtual entities, one or more simulated physical properties, and (b) values of one or more situational parameters indicative of a state of the sensor during acquisition of the readings, wherein the values of the one or more situational parameters are readings of one or more situational sensors, sensing the state of the sensor and its surroundings during acquisition of the readings;

determining, by the processing circuitry, for at least one given virtual entity of the virtual entities, a virtual entity visualization of the given virtual entity, the virtual entity visualization determined by manipulating a simulated reading of the simulated physical properties based on (a) the parameters affecting the real-world visualization, and (b) the values of the situational parameters, wherein the virtual entity visualization of the given virtual entity is perceived closer to a third visualization of the given virtual entity had it been a real-world entity having physical properties identical to the simulated physical properties than an alternative visualization of the given virtual entity determined without manipulating the simulated reading of the simulated physical properties based on the parameters affecting the readings of the sensor; and displaying, by the processing circuitry, the virtual entity visualizations in combination with the real-world visualization, thereby enabling a user viewing the output device to view the virtual entity visualizations and the real-world visualization.

11. The method of claim 10, wherein: (a) the real-world visualization is provided to the output device via a first communication channel and the virtual entity visualizations are injected into the output device via a second communication channel other than the first communication channel, (b) the parameters affect the real-world visualization by affecting the first communication channel, and (c) the manipulating of the simulated reading further includes simulating communication effects of the first communication channel on the virtual entity visualizations.

12. The method of claim 10, wherein the manipulating of the simulated reading further includes employing one or more algorithms, employed on the readings of the real-world data, also on the simulated reading.

13. The method of claim 10, wherein the parameters affect the real-world visualization by affecting the readings.

14. The method of claim 13, wherein the parameters include one or more of:

a. a noise model characterizing readings of the sensor;
b. a spectral sensitivity of the sensor;
c. a spectral response of the sensor;
d. a saturation of the sensor;
e. a dynamic range of the sensor;
f. a dark noise of the sensor;
g. a signal-to-noise ratio of the sensor;
h. a detection limit of the sensor;
i. a photo response non uniformity of the sensor;
j. a penetration depth of the sensor;
k. a lens distortion of the sensor;
l. an optical deformation model of the sensor;
m. a vignetting model of the sensor;
n. response to different exposure levels of the sensor; or
o. a resolution map of the readings acquired by the sensor.

15. The method of claim 10, further comprising:

obtaining, by the processing circuitry, information of movement of the sensor during acquisition of the readings;

determining, by the processing circuitry, if the movement of the sensor generates an effect on the real-world visualization, utilizing the information and the parameters;

wherein upon determining that the movement generates the effect, the manipulating of the simulated reading further includes simulating the effect on the simulated reading.

16. The method of claim 10, further comprising:

obtaining, by the processing circuitry, information of simulated movement of the given virtual entity during acquisition of the readings;

determining, by the processing circuitry, if the simulated movement of the given virtual entity is required to generate an effect on the simulated reading, utilizing the information and the parameters;

wherein upon determining that the movement is required to generate the effect, the manipulating of the simulated reading further includes simulating the effect on the simulated reading.

17. The method of claim 10, further comprising:

obtaining, by the processing circuitry, information of environmental parameters of at least part of a region from which the readings are acquired;

determining, by the processing circuitry, if the environmental parameters generate an effect on the real-world visualization, utilizing the information and the parameters;

wherein upon determining that the environmental parameters generate the effect, the manipulating of the simulated reading further includes simulating the effect on the simulated reading.

18. A non-transitory computer readable storage medium having computer readable program code embodied therewith, the computer readable program code, executable by at least one processor of a computer to perform a method comprising:

obtaining, by a processing circuitry, (a) information of one or more virtual entities located within an area from which readings are acquired by a sensor configured to acquire readings of real-world data, and display, on an output device, a real-world visualization of the real-world data based on the readings to a user, wherein the sensor has one or more parameters affecting the real-world visualization, and wherein the information defining, for each of the virtual entities, one or more simulated physical properties, and (b) values of one or more situational parameters indicative of a state of the sensor during acquisition of the readings, wherein the values of the one or more situational parameters are readings of one or more situational sensors, sensing the state of the sensor and its surroundings during acquisition of the readings;

determining, by the processing circuitry, for at least one given virtual entity of the virtual entities, a virtual entity visualization of the given virtual entity, the virtual entity visualization determined by manipulating a simulated reading of the simulated physical properties based on (a) the parameters affecting the real-world visualization, and (b) the values of the situational parameters, wherein the virtual entity visualization of the given virtual entity is perceived closer to a third visualization of the given virtual entity had it been a real-world entity having physical properties identical to the simulated physical properties than an alternative visualization of the given virtual entity determined without manipulating the simulated reading of the simulated physical properties based on the parameters affecting the readings of the sensor; and displaying, by the processing circuitry, the virtual entity visualizations in combination with the real-world visualization, thereby enabling a user viewing the output device to view the virtual entity visualizations and the real-world visualization.

* * * * *